(12) United States Patent
Chang et al.

(10) Patent No.: US 10,586,063 B2
(45) Date of Patent: Mar. 10, 2020

(54) METHOD AND APPARATUS FOR STORING FILE BY USING A PLURALITY OF CLOUD STORAGES

(71) Applicant: SAMSUNG ELECTRONICS CO., LTD., Suwon-si, Gyeonggi-do (KR)

(72) Inventors: Kyung-ah Chang, Seoul (KR); Jeong-hyun Yun, Suwon-si (KR); Sangjeong Lee, Seoul (KR); Hyo-gun Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 259 days.

(21) Appl. No.: 15/232,501

(22) Filed: Aug. 9, 2016

(65) Prior Publication Data

US 2016/0350551 A1 Dec. 1, 2016

Related U.S. Application Data

(63) Continuation of application No. 15/071,304, filed on Mar. 16, 2016.

(30) Foreign Application Priority Data

Mar. 20, 2015 (KR) .................. 10-2015-0038954

(51) Int. Cl.
*G06F 21/62* (2013.01)
*G06F 3/06* (2006.01)

(52) U.S. Cl.
CPC .......... *G06F 21/6218* (2013.01); *G06F 3/064* (2013.01); *G06F 3/067* (2013.01); *G06F 3/0623* (2013.01); *G06F 21/6209* (2013.01); *G06F 21/6227* (2013.01)

(58) Field of Classification Search
CPC ................................................ G06F 12/1408
USPC ............................................... 713/165
See application file for complete search history.

(56) References Cited

U.S. PATENT DOCUMENTS

| 8,627,446 | B1 * | 1/2014 | Eaton | H04L 67/28 |
| | | | | 726/12 |
| 2010/0333116 | A1 | 12/2010 | Prahlad et al. | |
| 2012/0042162 | A1 * | 2/2012 | Anglin | G06F 21/57 |
| | | | | 713/165 |
| 2012/0278622 | A1 * | 11/2012 | Lesavich | G06F 17/30864 |
| | | | | 713/168 |
| 2012/0303736 | A1 | 11/2012 | Novotny et al. | |

(Continued)

FOREIGN PATENT DOCUMENTS

KR 10-2014-0140974 12/2014

OTHER PUBLICATIONS

Search Report and Written Opinion dated Jun. 21, 2016 in counterpart International Patent Application No. PCT/KR2016/002604 and English-language translation of same.

*Primary Examiner* — Dant B Shaifer Harriman
(74) *Attorney, Agent, or Firm* — Nixon & Vanderhye P.C.

(57) ABSTRACT

A device is provided including processing circuitry configured to generate a plurality of file fragments by splitting a file stored in the device, and to determine a plurality of cloud storages used to store respective file fragments from the plurality of file fragments, wherein the plurality of cloud storages are from among cloud storages in which a user of the device is registered; and communication circuitry configured to request the plurality of cloud storages to respectively store the plurality of file fragments.

20 Claims, 37 Drawing Sheets

(56) References Cited

U.S. PATENT DOCUMENTS

| | | | |
|---|---|---|---|
| 2013/0054611 A1* | 2/2013 | Lee | G06F 21/6227 707/741 |
| 2013/0073691 A1 | 3/2013 | Quan et al. | |
| 2013/0204849 A1 | 8/2013 | Chacko | |
| 2013/0305039 A1* | 11/2013 | Gauda | G06F 21/6218 713/153 |
| 2014/0172929 A1* | 6/2014 | Sedayao | G06F 17/30212 707/827 |
| 2014/0237614 A1* | 8/2014 | Irvine | G06F 21/6218 726/26 |
| 2014/0282938 A1* | 9/2014 | Moisa | G06F 21/6218 726/6 |
| 2015/0052354 A1 | 2/2015 | Purohit | |
| 2015/0178007 A1* | 6/2015 | Moisa | G06F 17/30112 713/190 |

* cited by examiner

FIG. 6

| | FIRST CLOUD STORAGE | SECOND CLOUD STORAGE | THIRD CLOUD STORAGE |
|---|---|---|---|
| ADDRESS INFORMATION | https://www.first_cloud.com/ | https://www.second_cloud.com/ | https://www.third_cloud.com/ |
| USER ACCOUNT INFORMATION | first_cloud_ID | second_cloud_ID | third_cloud_ID |

610 — (header row)
620 — ADDRESS INFORMATION
630 — USER ACCOUNT INFORMATION

FIG. 7

| FILE TITLE | FILE SIZE | FILE FRAGMENT 1 | | | FILE FRAGMENT 2 | | | FILE FRAGMENT 3 | | |
|---|---|---|---|---|---|---|---|---|---|---|
| | | LOCATION OF FILE FRAGMENT | IDENTIFICATION INFORMATION OF FILE FRAGMENT | STORAGE LOCATION OF FILE FRAGMENT | LOCATION OF FILE FRAGMENT | IDENTIFICATION INFORMATION OF FILE FRAGMENT | STORAGE LOCATION OF FILE FRAGMENT | LOCATION OF FILE FRAGMENT | IDENTIFICATION INFORMATION OF FILE FRAGMENT | STORAGE LOCATION OF FILE FRAGMENT |
| File1.avi | 1.5MB | 1–500KB | File1_piece_1.part | FIRST CLOUD STORAGE | 501KB–1000KB | File1_piece_2.part | SECOND CLOUD STORAGE | 1001KB–1500KB | File1_piece_3.part | THIRD CLOUD STORAGE |

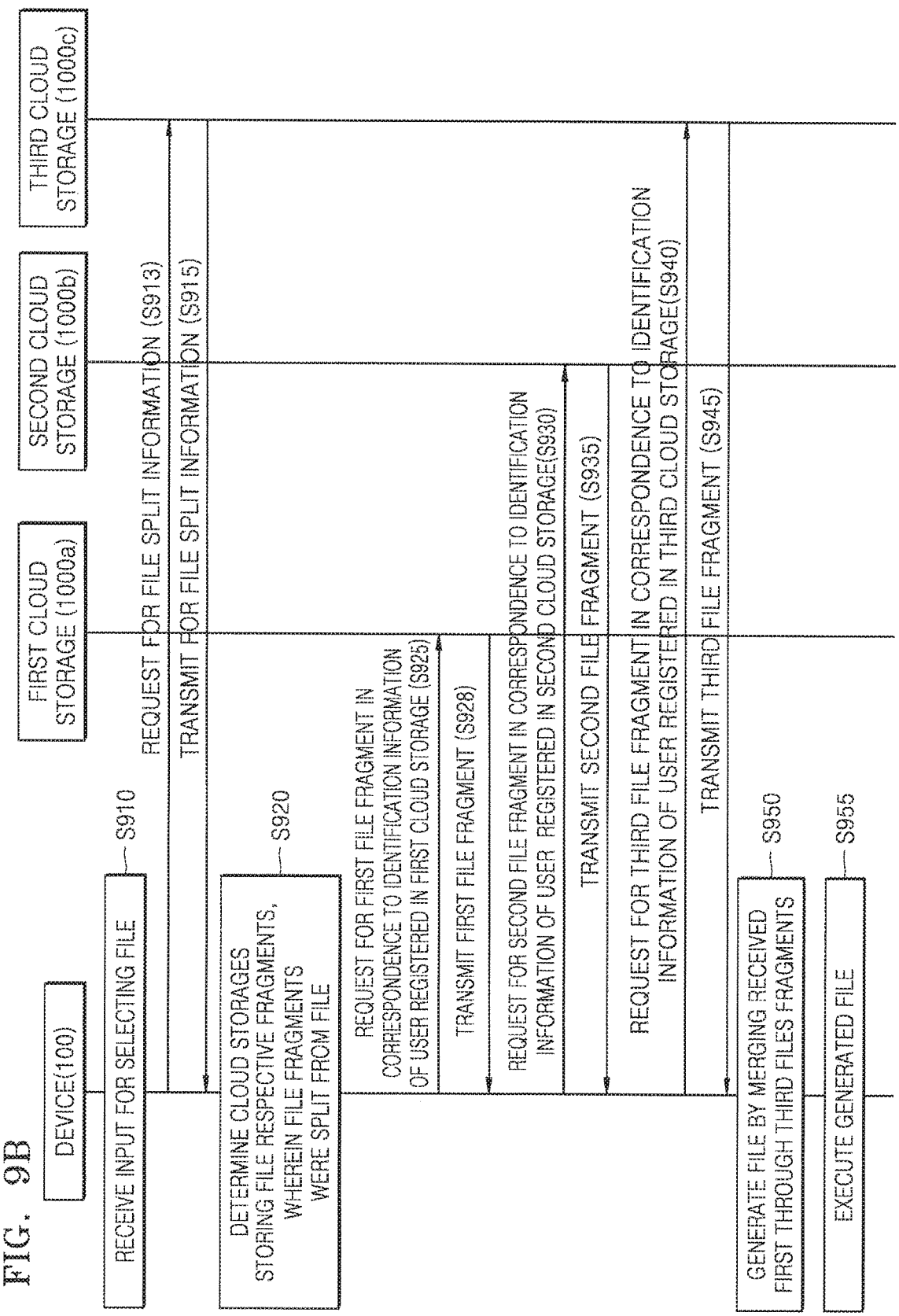

FIG. 14B

| FILE TITLE (710) | FILE SIZE (720) | FILE FRAGMENT 1 (730) | | | FILE FRAGMENT 2 (740) | | | FILE FRAGMENT 3 (750) | | |
|---|---|---|---|---|---|---|---|---|---|---|
| | | LOCATION OF FILE FRAGMENT (760) | IDENTIFICATION INFORMATION OF FILE FRAGMENT (770) | STORAGE LOCATION OF FILE FRAGMENT (780) | LOCATION OF FILE FRAGMENT | IDENTIFICATION INFORMATION OF FILE FRAGMENT | STORAGE LOCATION OF FILE FRAGMENT | LOCATION OF FILE FRAGMENT | IDENTIFICATION INFORMATION OF FILE FRAGMENT | STORAGE LOCATION OF FILE FRAGMENT |
| File1.avi | 1.5MB | 1–500KB | File1_piece_1.part | FIRST CLOUD STORAGE / SECOND CLOUD STORAGE | 501KB–1000KB | File1_piece_2.part | SECOND CLOUD STORAGE / THIRD CLOUD STORAGE | 1001KB–1500KB | File1_piece_3.part | THIRD CLOUD STORAGE / FIRST CLOUD STORAGE |

FIG. 16B

| FILE TITLE | FILE SIZE | ENCRYPTION INFORMATION | FILE FRAGMENT 1 | | | FILE FRAGMENT 2 | | | FILE FRAGMENT 3 | | |
|---|---|---|---|---|---|---|---|---|---|---|---|
| | | | RANGE | IDENTIFICATION INFORMATION OF FILE FRAGMENT | STORAGE LOCATION OF FILE FRAGMENT | RANGE | IDENTIFICATION INFORMATION OF FILE FRAGMENT | STORAGE LOCATION OF FILE FRAGMENT | RANGE | IDENTIFICATION INFORMATION OF FILE FRAGMENT | STORAGE LOCATION OF FILE FRAGMENT |
| File1.avi | 1.5MB | ENCRYPTION KEY | 1–500KB | File1_piece_1.part | FIRST CLOUD STORAGE / SECOND CLOUD STORAGE | 501KB–1000KB | File1_piece_2.part | SECOND CLOUD STORAGE / THIRD CLOUD STORAGE | 1001KB–1500KB | File1_piece_3.part | THIRD CLOUD STORAGE / FIRST CLOUD STORAGE |

FIG. 17B

| FILE TITLE | FILE SIZE | FILE FRAGMENT 1 | | | | FILE FRAGMENT 2 | | | | FILE FRAGMENT 3 | | | |
|---|---|---|---|---|---|---|---|---|---|---|---|---|---|
| | | RANGE | IDENTIFICATION INFORMATION OF FILE FRAGMENT | STORAGE LOCATION OF FILE FRAGMENT | ENCRYPTION INFORMATION | RANGE | IDENTIFICATION INFORMATION OF FILE FRAGMENT | STORAGE LOCATION OF FILE FRAGMENT | ENCRYPTION INFORMATION | RANGE | IDENTIFICATION INFORMATION OF FILE FRAGMENT | STORAGE LOCATION OF FILE FRAGMENT | ENCRYPTION INFORMATION |
| File1.avi | 1.5MB | 1-500KB | File1_piece_1.part | FIRST CLOUD STORAGE / SECOND CLOUD STORAGE | ENCRYPTION KEY 1 | 1KB-1000KB | File1_piece_2.part | SECOND CLOUD STORAGE / THIRD CLOUD STORAGE | ENCRYPTION KEY 2 | 1001KB-1500KB | File1_piece_3.part | THIRD CLOUD STORAGE / FIRST CLOUD STORAGE | ENCRYPTION KEY 3 |

METHOD AND APPARATUS FOR STORING FILE BY USING A PLURALITY OF CLOUD STORAGES

CROSS-REFERENCE TO RELATED APPLICATION

This application is a continuation of U.S. application Ser. No. 15/071,304, filed Mar. 16, 2016, which claims priority under 35 U.S.C. § 119 to Korean Patent Application No. 10-2015-0038954, filed on Mar. 20, 2015, in the Korean Intellectual Property Office. The entire disclosure of each of these applications is incorporated herein by reference.

BACKGROUND

1. Field

The disclosure relates generally to methods and apparatuses for splitting a file into a plurality of file fragments, and distributing and storing the file fragments in a plurality of cloud storages.

2. Description of Related Art

Due to developments in network technologies, data that used to be stored in desktop computers, notebook computers, or portable apparatuses may now be stored in a cloud storage on the Internet, and whenever the data is needed, a user may download the data from the cloud storage by using his/her account anytime and anywhere.

However, since a plurality of users may access the cloud storage, there is a possibility that the user's data may be hacked into. In addition, there is also a possibility that account information of the user may be exposed to another person, such that a plurality of items of personal data stored in the cloud storage may be exposed to the other person.

SUMMARY

Various example embodiments of splitting a file into a plurality of file fragments, distributing and storing the file fragments in a plurality of cloud storages, and reconstructing the file by receiving the stored file fragments are provided.

Additional aspects will be set forth in part in the description which follows and, in part, will be apparent from the description.

According to an aspect of an example embodiment, a device includes a controller (e.g., including processing circuitry) configured to generate a plurality of file fragments by splitting a file stored in the device, and to select a plurality of cloud storages, each of said plurality of cloud storages used to respectively store at least one selected fragment of the plurality of file fragments, wherein the plurality of cloud storages are selected from among cloud storages to which a user of the device is registered; and a communicator (e.g., including communication circuitry) configured to request the plurality of cloud storages to respectively store the plurality of file fragments.

The file stored in the device may have been received from one cloud storage among the plurality of cloud storages.

The controller may be further configured to select, from among the plurality of cloud storages, two or more cloud storages used to store a first file fragment from among the plurality of file fragments, and the communicator may be further configured to request each of the two or more cloud storages to store the first file fragment.

The communicator may be further configured to request at least one among the plurality of cloud storages to store file split information, the file split information including identification information of the plurality of file fragments and a identification information of the plurality of cloud storages storing the plurality of file fragments.

The controller may be further configured to encrypt the file, based on an encryption key, to generate the plurality of file fragments by splitting the encrypted file, and to store the encryption key in the device or in at least one among the plurality of cloud storages.

The controller may be further configured to generate the plurality of file fragments by splitting the file, to encrypt one or more file fragments among the plurality of file fragments, based on an encryption key, and to store the encryption key in the device or in at least one among the plurality of cloud storages, and the communicator may be further configured to request the plurality of cloud storages to respectively store selected fragments of the plurality of file fragments including the two or more encrypted file fragments.

When the selected file fragments are respectively stored in the plurality of cloud storages, the controller may be further configured to delete the file stored in the device.

The file stored in the device may also be stored in a cloud storage from among the plurality of cloud storages, and the communicator may be further configured to request the cloud storage storing the file to delete the file.

According to an aspect of another example embodiment, a device includes a controller (e.g., including processing circuitry) configured to determine a plurality of cloud storages respectively storing a plurality of file fragments split from a file; and a communicator (e.g., including communication circuitry) configured to receive the plurality of file fragments respectively from the plurality of cloud storages, wherein the controller is further configured to regenerate the file by merging the plurality of file fragments, and to execute the generated file.

The communicator may be further configured to receive, from at least one among the plurality of cloud storages, file split information including identification information of the plurality of file fragments and identification information of the plurality of cloud storages storing the plurality of file fragments, and the controller may be further configured to determine, based on the file split information, the plurality of cloud storages respectively storing the plurality of file fragments.

A first file fragment from among the plurality of file fragments may be stored in two or more cloud storages from among the plurality of cloud storages, the controller may be further configured to select one from among the two or more cloud storages storing the first file fragment, and the communicator may be further configured to receive the first file fragment from the selected cloud storage.

A second file fragment from among the plurality of file fragments may be stored in two or more cloud storages from among the plurality of cloud storages, and the communicator may be further configured to receive different portions of the second file fragment from the two or more cloud storages.

Each of the plurality of file fragments may be encrypted after the file is split into the plurality of file fragments, the communicator may be further configured to receive, from the device or at least one among the plurality of cloud storages, a decryption key used to decrypt the plurality of encrypted file fragments, and the controller may be further configured to decrypt the plurality of encrypted file fragments, based on the decryption key, and to regenerate the file by merging the plurality of decrypted file fragments.

The plurality of file fragments may be split from the file after the file is encrypted, the communicator may be further configured to receive, from the device or at least one among the plurality of cloud storages, a decryption key used to decrypt the encrypted file, and the controller may be further configured to regenerate the encrypted file by merging the plurality of file fragments and to decrypt the regenerated encrypted file, based on the decryption key.

According to an aspect of another example embodiment, a method of storing a file includes: generating a plurality of file fragments by splitting the file stored in a device; selecting a plurality of cloud storages, each of said plurality of cloud storages used to respectively store at least one selected fragment of the plurality of file fragments, wherein the plurality of cloud storages are selected from among cloud storages to which a user of the device is registered; and requesting the selected plurality of cloud storages to each respectively store at least one selected fragment of the plurality of file fragments.

The file stored in the device may have been received from one among the plurality of cloud storages.

The selecting of the plurality of cloud storages may include selecting, from among the plurality of cloud storages, two or more cloud storages used to store a first file fragment from among the plurality of file fragments, and the requesting of the plurality of cloud storages may include requesting each of the two or more cloud storages to store the first file fragment.

The method may further include requesting at least one among the plurality of cloud storages to store file split information, the file split information including identification information of the plurality of file fragments and identification information of the plurality of cloud storages storing the plurality of file fragments.

The generating of the plurality of file fragments may include encrypting the file, based on an encryption key; and generating the plurality of file fragments by splitting the encrypted file, and storing the encryption key in the device or in at least one among the plurality of cloud storages.

The generating of the plurality of file fragments may include generating the plurality of file fragments by splitting the file; and encrypting two or more file fragments among the plurality of file fragments, based on an encryption key, and storing the encryption key in the device or in at least one among the plurality of cloud storages, and wherein the requesting of the plurality of cloud storages includes requesting each of the selected plurality of cloud storages to respectively store at least one of the plurality of file fragments, the plurality of file fragments including the two or more encrypted file fragments.

When the plurality of file fragments are respectively stored in the selected plurality of cloud storages, the method may further include deleting the file stored in the device.

The file stored in the device may also be stored in a cloud storage from among the plurality of cloud storages, and the method may further include requesting the cloud storage storing the file to delete the file.

According to an aspect of another example embodiment, a method, performed by a device, of executing a file includes determining a plurality of cloud storages each respectively storing at least one of a plurality of file fragments split from a file; receiving the plurality of file fragments from the plurality of cloud storages; and generating the file by merging the plurality of file fragments; and executing the generated file.

The determining of the plurality of cloud storages may include receiving, from at least one among the plurality of cloud storages, file split information identification information of the plurality of file fragments and identification information of the plurality of cloud storages storing the plurality of file fragments; and determining, based on the file split information, the plurality of cloud storages respectively storing the plurality of file fragments split from the file.

A first file fragment from among the plurality of file fragments may be stored in two or more cloud storages from among the plurality of cloud storages, and the receiving of the plurality of file fragments may include selecting one from among the two or more cloud storages storing the first file fragment; and receiving the first file fragment from the selected cloud storage.

A second file fragment from among the plurality of file fragments may be stored in two or more cloud storages from among the plurality of cloud storages, and the receiving of the plurality of file fragments may include receiving different portions of the second file fragment from the two or more cloud storages.

Each of the plurality of file fragments may be encrypted after the file is split into the plurality of file fragments, and the generating of the file may include receiving, from the device or at least one among the plurality of cloud storages, a decryption key used to decrypt the plurality of encrypted file fragments; decrypting the plurality of encrypted file fragments, based on the decryption key; and generating the file by merging the plurality of decrypted file fragments.

The plurality of file fragments may be split from the file after the file is encrypted, and the generating of the file may include receiving, from the device or at least one among the plurality of cloud storages, a decryption key used to decrypt the encrypted file; generating the file by merging the plurality of file fragments; and decrypting the generated file, based on the decryption key.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 6 is a diagram illustrating an example chart including information about the cloud storages, which is stored in the device;

FIG. 7 is a diagram illustrating an example table of file split information;

FIG. 9B is a sequence diagram illustrating an example of receiving file split information from the cloud storage, and receiving a file fragment from the cloud storage, based on the file split information, the method being performed by the device;

FIGS. 14A through 14D are diagrams illustrating an example method of receiving a file fragment from the cloud storages, when a cloud storage from among the cloud storages is not operable, the method being performed by the device;

FIGS. 16A and 16B are diagrams illustrating an example method of encrypting a file, the method being performed by the device;

FIGS. 17A and 17B are diagrams illustrating an example method of encrypting a file, the method being performed by the device;

DETAILED DESCRIPTION

Figure 1:
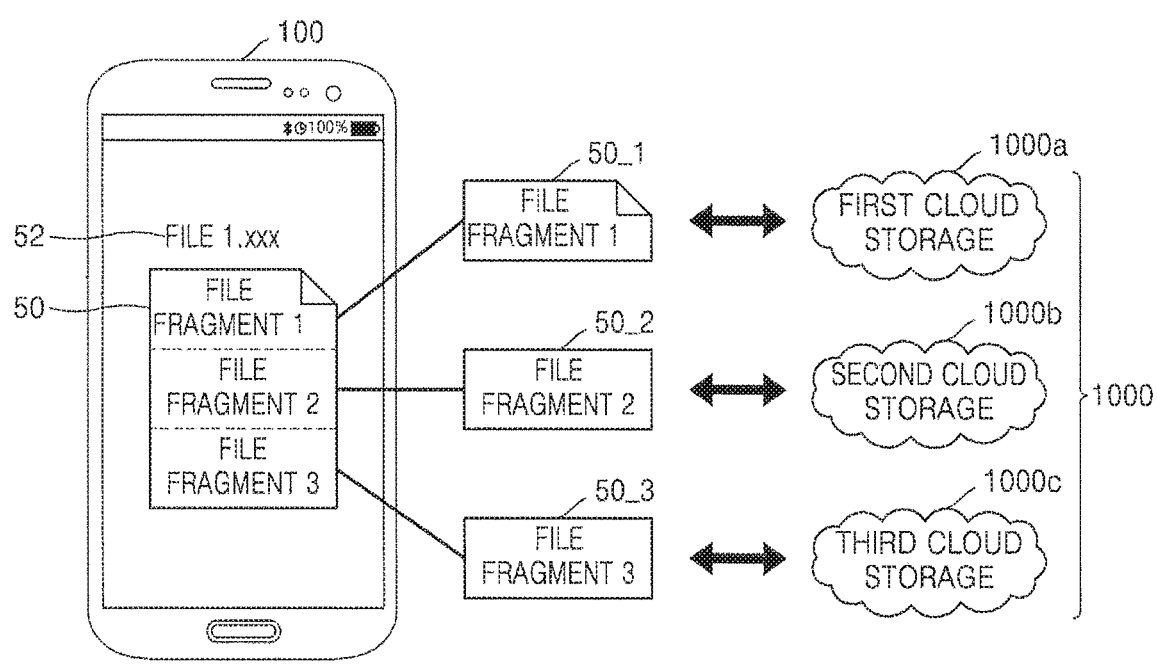
FIG. 1 is a diagram illustrating an example method of distributing and storing a file in a plurality of cloud storages, the method being performed by a device.

Hereinafter, terms that are used in the disclosure will be briefly described, and the example embodiments will be described in greater detail.

All terms including descriptive or technical terms which are used herein should be construed as having meanings that are apparent to one of ordinary skill in the art. However, the terms may have different meanings according to an intention of one of ordinary skill in the art, precedent, or the appearance of new technologies. Some terms may be arbitrarily selected, and in this case, the meaning of the selected terms will be described in greater detail in the detailed description. Thus, the terms used herein should be defined based on the meaning of the terms together with the description throughout the disclosure.

When a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware (e.g., circuitry), firmware or software or embodied by combining hardware, firmware and/or software.

Throughout the disclosure, the term "distribute and store a file" may indicate, for example, that the file is split into a plurality of file fragments, and the file fragments are distributed and stored in a plurality of cloud servers.

Throughout the disclosure, the term "cloud storage" may indicate, for example, a device that stores a file. The cloud storage may be formed as one storage device or a plurality of storage devices.

The cloud storage may, for example, be run by a service provider that provides a file storage service. For example, the service provider may provide a free or charged file storage space to users who joined a service. The cloud storage may transmit a user's file to a device of a user or may receive a user's file from the device of the user, via a network, etc.

When the user joins the service provided by the service provider, the user may register his/her unique account in the cloud storage. The cloud storage may store, for example, a file of the user, based on the account of the user which is registered in the cloud storage. The cloud storage may transmit, based on the account of the user, the stored file of the user to the device of the user or another user's device shared with the user.

The cloud storage may, for example, restrict another user's access to the file of the user, based on an access policy with respect to the file of the user which is set by the user. For example, the cloud storage may permit an access to the file of the user only to another user who is access-granted by the user. The cloud storage may permit access to the file of the user to all users, based on a setting by the user.

One or more example embodiments will now be described more fully with reference to the accompanying drawings. However, the one or more example embodiments may be embodied in many different forms, and should not be construed as being limited to the example embodiments set forth herein; rather, these example embodiments are provided so that this disclosure will convey the concept of the one or more example embodiments to those of ordinary skill in the art. In the following description, well-known functions or constructions may not described in detail since they may obscure the one or more example embodiments with unnecessary detail, and throughout the disclosure, like reference numerals in the drawings denote like elements.

As used herein, the term "and/or" includes any and all combinations of one or more of the associated listed items. Expressions such as "at least one of," when preceding a list of elements, modify the entire list of elements and do not necessarily modify the individual elements of the list.

FIG. 1 is a diagram illustrating an example method of distributing and storing a file 50 in a plurality of cloud storages 1000a, 1000b, and 1000c, the method being performed by a device 100.

Referring to FIG. 1, the device 100 may split the file 50 into a file fragment 1 50_1, a file fragment 2 50_2, and a file fragment 3 50_3, and may distribute and store the file fragments 1 50_1, 2 50_2, and 3 50_3 in respective cloud storages 1000a, 1000b, and 1000c. Hereinafter, the cloud storages 1000a, 1000b, and 1000c may also be referred, for example to as the first, second, and third cloud storages 1000a, 1000b, and 1000c, or the cloud storages 1000 (see, e.g., FIG. 23).

For example, the device 100 may receive an input requesting the device 100 to distribute and store the file 50. When the input requesting the device 100 to distribute and store the file 50 is received, the device 100 may, for example, generate the file fragments 1 50_1, 2 50_2, and 3 50_3 by splitting the file 50, and may determine or select the cloud storages 1000 in which to store each of the file fragments 1 50_1, 2 50_2, and 3 50_3, respectively, wherein the selected cloud storages 1000 are selected from among a plurality of cloud storages in which a user of the device 100 is registered.

When the cloud storages 1000 to store the file fragments 1 50_1, 2 50_2, and 3 50_3 are selected, the device 100 may request the selected cloud storages 1000 to store the file fragments 1 50_1, 2 50_2, and 3 50_3, respectively. For example, the device 100 may request the first cloud storage 1000a to store the file fragment 1 50_1 in correspondence to or association with identification (ID) of the user registered in the first cloud storage 1000a. The cloud storages 1000 may store the file fragments 1 50_1, 2 50_2, and 3 50_3, respectively, in correspondence to identification information of the user.

The device 100 may store file split information in the device 100 or the cloud storage 1000. The file split information may include, for example, identification information of each of the file fragments 1 50_1, 2 50_2, and 3 50_3, and identification information of each of the cloud storages 1000 storing the file fragments 1 50_1, 2 50_2, and 3 50_3.

The device 100 may receive the file fragments 1 50_1, 2 50_2, and 3 50_3 from the cloud storages 1000, and may regenerate or reconstitute the file 50 by merging the received file fragments 1 50_1, 2 50_2, and 3 50_3.

For example, the device 100 may receive an input selecting identification information 52 of the file 50 split into the file fragments 1 50_1, 2 50_2, and 3 50_3. When the selected file 50 is a file that was split into the file fragments 1 50_1, 2 50_2, and 3 50_3 and was distributed and stored in the cloud storages 1000, the device 100 may determine, based on the file split information, the cloud storages 1000 that store the file fragments 1 50_1, 2 50_2, and 3 50_3, respectively. The device 100 may request the cloud storages 1000 for the file fragments 1 50_1, 2 50_2, and 3 50_3, respectively, and may receive the file fragments 1 50_1, 2 50_2, and 3 50_3. The device 100 may generate (e.g., regenerate) the file 50 by merging the received file fragments 1 50_1, 2 50_2, and 3 50_3, and may execute the generated file 50.

Figure 2:
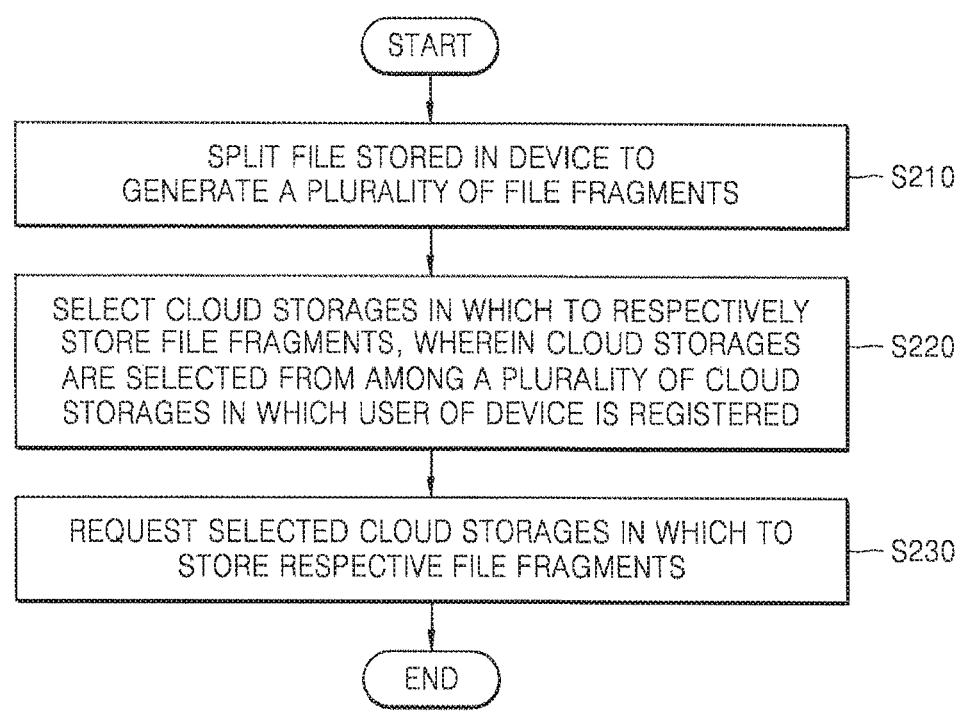
FIG. 2 is a flowchart illustrating an example method of splitting a file into a plurality of file fragments, and distributing and storing the file fragments in the cloud storages, the method being performed by the device, according to another exemplary embodiment.

FIG. 2 is a flowchart illustrating an example method of splitting a file into a plurality of file fragments, and distributing and storing the file fragments in the cloud storages 1000, the method being performed by the device 100.

In operation S210, the device 100 may split the file stored in the device 100 to generate the file fragments.

The file stored in the device 100 may be a file that was pre-stored in the device 100. The file stored in the device 100 may be a file that is received from the cloud storage 1000.

The device 100 may optionally, for example, encrypt the file, may split the encrypted file, and may generate the file fragments. The device 100 may generate the file fragments by splitting the file, and may encrypt at least one file fragment among the file fragments.

In operation S220, the device 100 may select the cloud storages 1000 in which to store the file fragments, respectively, wherein the cloud storages 1000 are selected from among a plurality of cloud storages in which a user of the device 100 is registered.

According to a storage capacity of each of the cloud storages 1000, a security level set to the file, or an input for selecting the cloud storages 1000, the device 100 may determine the cloud storages 1000 in which to store the respective file fragments.

The device 100 may determine one cloud storage 1000 to store one file fragment among the file fragments. The device 100 may determine the cloud storages 1000 to store one file fragment among the file fragments.

In operation S230, the device 100 may request the selected cloud storages 1000 to store the respective file fragments.

For example, the device 100 may request, based on address information of the first cloud storage 1000a, the first cloud storage 1000a to store a first file fragment in correspondence to identification information of the user registered in the first cloud storage 1000a.

In this example, the device 100 may also transmit information about a location in the first cloud storage 1000a where the first file fragment is to be stored. For example, the location in the first cloud storage 1000a where the first file fragment is to be stored may be a folder where an original version of the file was stored, a default folder, a root folder, or the like. The device 100 may receive an input for selecting a folder to store the first file fragment, and may, for example, transmit, as a folder to store the first file fragment, identification information of the selected folder to the first cloud storage 1000a.

The device 100 may, for example, sequentially store the file fragments in the cloud storages 1000. For example, the device 100 may store the first file fragment in the first cloud storage 1000a, and then may store the second file fragment in the second cloud storage 1000b. The device 100 may simultaneously store the file fragments in the cloud storages 1000. For example, the device 100 may simultaneously maintain respective sessions with respect to the cloud storages 1000, and may simultaneously store the file fragments in the cloud storages 1000.

The device 100 may request at least one among the selected cloud storages 1000 to store file split information including identification information of the file fragments and identification information of the cloud storages 1000 to store the file fragments.

When the file stored in the device 100 is also stored in one among the cloud storages 1000, the device 100 may request the cloud storage 1000, which stores the file, to delete the file.

When the file fragments are respectively stored in the selected cloud storages 1000, the device 100 may move the file to a predefined folder for distributed-and-stored files in the device 100.

Figure 3:
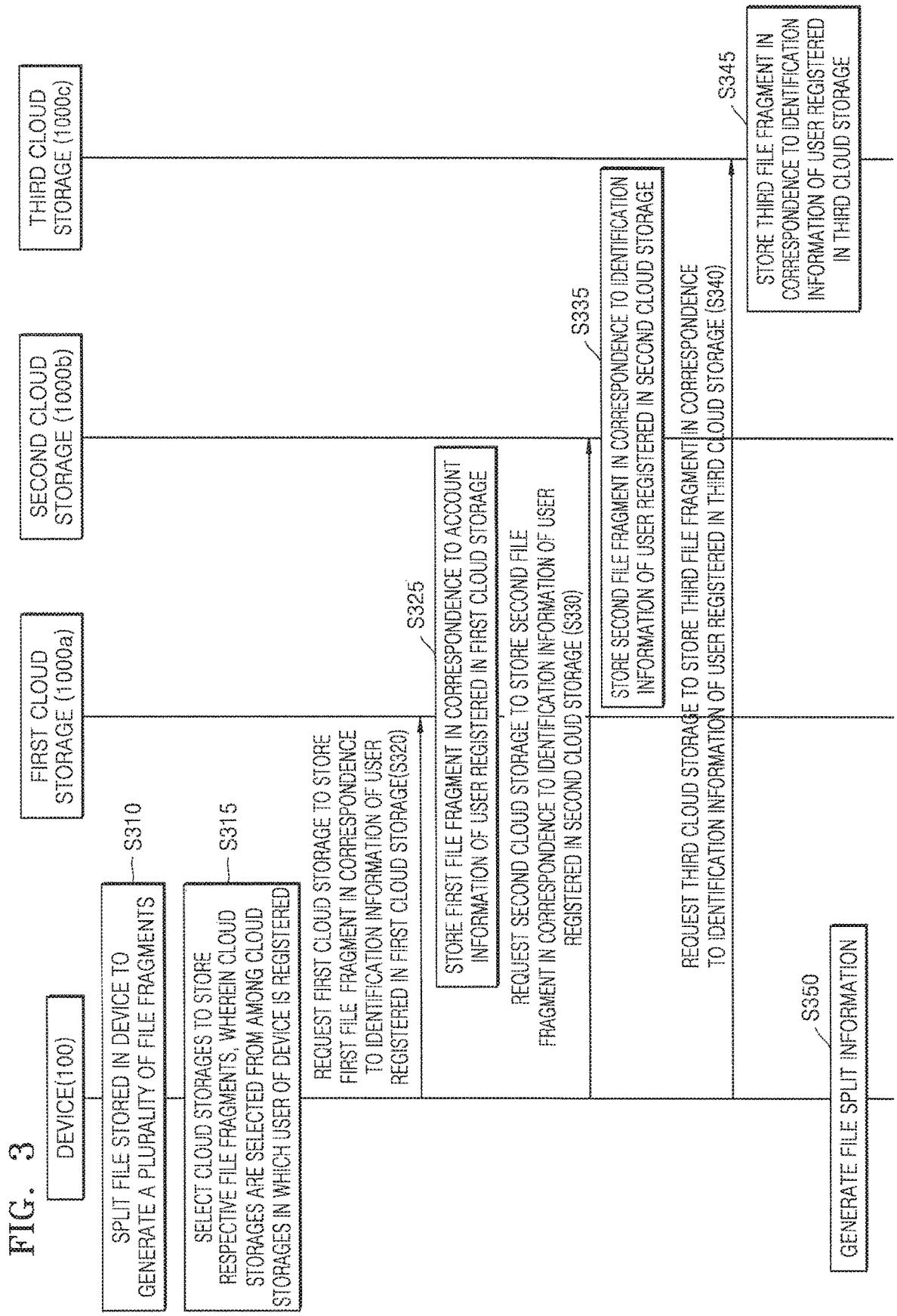
FIG. 3 is a sequence diagram illustrating an example method of distributing and storing a file in the cloud storages, the method being performed by the device.

FIG. 3 is a sequence diagram illustrating an example method of distributing and storing a file in the cloud storages 1000, the method being performed by the device 100.

In operation S310, the device 100 may split a file stored in the device 100 and thus may generate a plurality of file fragments.

The file stored in the device 100 may be a file that was pre-stored in the device 100. When the device 100 receives an input for selecting one file from among files pre-stored in the device 100 and an input for distributing and storing the selected file, the device 100 may split the selected file and thus may generate a plurality of file fragments.

The file stored in the device 100 may be a file received from the cloud storage 1000. For example, the device 100 may store only metadata of one or more files of a user, and content data of the files may be stored in the cloud storage 1000. The metadata of the files may include a list of the files. When an input for selecting a file from the list of the files and an input for distributing and storing the selected file are received, the device 100 may request the cloud storage 1000 for content data of the selected file and may receive the content data of the selected file. When the device 100 receives the content data of the selected file from the cloud storage 1000, the device 100 may split the content data of the file received from the cloud storage 1000 and thus may generate a plurality of file fragments.

The device 100 may split the file into the file fragments, based, for example, on the number of the cloud storages 1000 in which the user of the device 100 is registered. For example, the device 100 may split the file into the number of file fragments which corresponds to the number of the cloud storages 1000 in which the user of the device 100 is registered. The device 100 may split the file into fragments of a preset size.

The device 100 may encrypt the file, and may generate file fragments by splitting an encrypted file. The device 100 may generate the file fragments by splitting the file and may encrypt at least one fragment from among the file fragments.

In operation S315, the device 100 may determine the cloud storages 1000 to store the respective file fragments, wherein the cloud storages 1000 are selected from among the cloud storages 1000 in which the user of the device 100 is registered.

The device 100 may provide a user interface for receiving an input selecting the cloud storages 1000 to store the file fragments, and may select the cloud storages 1000 so as to make the file distributed and stored only in the selected cloud storages 1000.

The device 100 may receive, from cloud storages 1000, information about a capacity of a storage space allocated to the user, and may determine the cloud storages 1000 so that the file may be distributed and stored only in the cloud storages 1000 whose remaining capacity is equal to or greater than a reference capacity.

The device 100 may determine the cloud storages 1000, based on a security level set for the file, so that the higher the security level of the file is, the more the file is distributed and stored in the cloud storages 1000.

The device 100 may determine one cloud storage 1000 to store one file fragment from among the file fragments. The device 100 may determine the cloud storages 1000 to store one file fragment from among the file fragments.

In operation S320, the device 100 may request the first cloud storage 1000a to store a first file fragment in correspondence to identification information of the user registered in the first cloud storage 1000a.

The device 100 may store address information of the first cloud storage 1000a. The device 100 may also store account information of the user registered in the first cloud storage 1000a. The account information of the user may include, for example, the identification information and password information of the user registered in the first cloud storage 1000a. The account information of the user may include access information which was issued to the device 100 when the first cloud storage 1000a authenticated the user based on the identification information and password information of the user which were transmitted from the device to the first cloud storage 1000a. The account information of the user may include, for example, session maintenance information used to maintain a session between the device 100 and the first cloud storage 1000a.

The device 100 may request, using the address information of the first cloud storage 1000a, the first cloud storage 1000a to store the first file fragment in correspondence to the identification information of the user registered in the first cloud storage 1000a.

The request for storing the first file fragment may include, for example, the account information of the user registered in the first cloud storage 1000a. The request for storing the first file fragment may include identification information of a folder to store the first file fragment.

In operation S325, the first cloud storage 1000a may store the first file fragment in correspondence to the account information of the user registered in the first cloud storage 1000a.

Based on the account information of the user received from the device 100, the first cloud storage 1000a may determine whether or not the user has authority to store a file in the first cloud storage 1000a.

If the user has the authority to store the file in the first cloud storage 1000a, the first cloud storage 1000a may store the first file fragment received from the device 100 in correspondence to the identification information of the user.

When the identification information of the folder in which to store the first file fragment is received from the device 100, the first cloud storage 1000a may determine a location of the folder to store the first file fragment, based on the identification information of the folder, and may store the first file fragment in the determined folder.

When the first cloud storage 1000a receives information indicating that the first file fragment received from the device 100 is a file fragment, the first cloud storage 1000a may store the first file fragment in the determined folder.

In operation S330, the device 100 may request the second cloud storage 1000b to store a second file fragment in correspondence to identification information of the user registered in the second cloud storage 1000b.

The device 100 may store address information of the second cloud storage 1000b. The device 100 may also store account information of the user registered in the second cloud storage 1000b.

The device 100 may request, based on the address information of the second cloud storage 1000b, the second cloud storage 1000b to store the second file fragment in correspondence to the identification information of the user registered in the second cloud storage 1000b.

In operation S335, the second cloud storage 1000b may store the second file fragment in correspondence to the identification information of the user registered in the second cloud storage 1000b.

Based on the account information of the user received from the device 100, the second cloud storage 1000b may determine whether or not the user has authority to store a file in the second cloud storage 1000b.

If the user has the authority to store the file in the second cloud storage 1000b, the second cloud storage 1000b may store the second file fragment received from the device 100, in correspondence to the identification information of the user.

In operation S340, the device 100 may request the third cloud storage 1000c to store a third file fragment in correspondence to identification information of the user registered in the third cloud storage 1000c.

The device 100 may store address information of the third cloud storage 1000c. The device 100 may also store account information of the user registered in the third cloud storage 1000c.

The device 100 may request, based on the address information of the third cloud storage 1000c, the third cloud storage 1000c to store the third file fragment in correspondence to the identification information of the user registered in the third cloud storage 1000c.

In operation S345, the third cloud storage 1000c may store the third file fragment in correspondence to the identification information of the user registered in the third cloud storage 1000c.

Based on the account information of the user received from the device 100, the third cloud storage 1000c may determine whether or not the user has authority to store a file in the third cloud storage 1000c.

If the user has the authority to store the file in the third cloud storage 1000c, the third cloud storage 1000c may store the third file fragment received from the device 100, in correspondence to the identification information of the user.

In operation S350, the device 100 may generate file split information.

The file split information may include identification information of each of the first through third file fragments, and the identification information of the cloud storages 1000 that store the first through third file fragments. The file split information may also include identification information of the file, information of a directory of the device in which the file is located, size information of the file, size information of each of the file fragments of the file, location information of each of the file fragments in the file, and order information of the file fragments in the file.

The device 100 may store the file split information in the form of a file. The file storing the file split information may be referred to as a file split information file. In an example embodiment, one file split information file may include file split information of all distributed and stored files. In another example embodiment, one file split information file may include file split information of one file.

The device 100 may store the file split information file in the device 100. The device 100 may request at least one among the cloud storages 1000 to store the file split information file in correspondence to the identification information of the user registered in the cloud storages 1000.

In an example embodiment, the device 100 may store the file split information in the form of a database. The database including the file split information may be referred to as a file split information database.

For example, the device 100 may generate the file split information database in the device 100. The device 100 may generate the file split information database in an external server, in correspondence to the identification information of the user. The device 100 may request the cloud storage 1000 to generate the file split information database in the cloud storage 1000, in correspondence to the identification information of the user which is registered in the cloud storage 1000. The device 100 may store file split information with respect to one file in the generated file split information database, in correspondence to identification information of the file.

When the file stored in the device 100 is a file that is stored in both the device 100 and the one among the cloud storages 1000, the device 100 may request the cloud storage 1000 storing the file to delete the file.

Since the file fragments are respectively stored in the cloud storages 1000, the device 100 may move the file to a predefined folder for distributed-and-stored files in the device 100.

When the respective file fragments are stored in the cloud storages 1000, the device 100 may store information as metadata of the file, wherein the metadata information indicates that the file has been distributed and stored in the cloud storages 1000.

Figure 4:
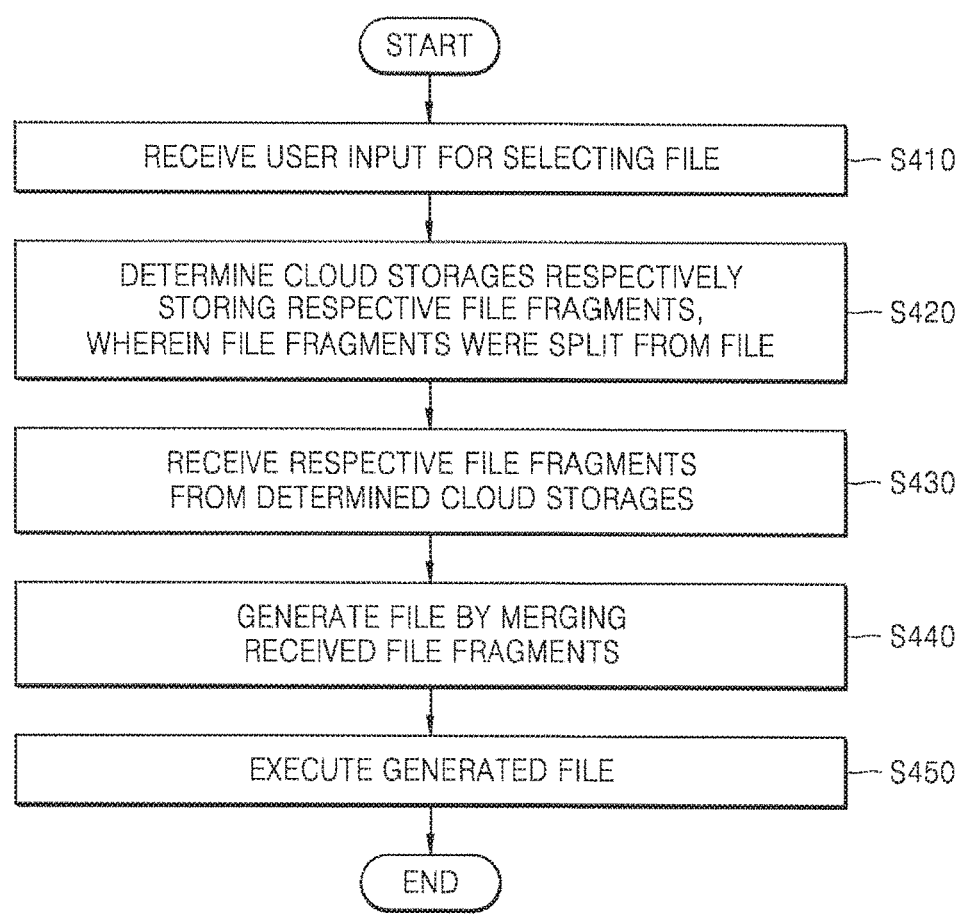
FIG. 4 is a flowchart illustrating an example method of receiving a plurality of split file fragments of a file from the cloud storages and executing the file, the method being performed by the device.

FIG. 4 is a flowchart illustrating an example method of receiving a plurality of split file fragments of a file from the cloud storages 1000 and executing the file, the method being performed by the device 100.

In operation S410, the device 100 may receive an input for selecting the file.

By receiving the input for selecting the file from a files list, the device 100 may receive the input for selecting the file.

In the device 100, whether or not the file has been split into the file fragments may be stored as metadata of the file, in correspondence to identification information of the file. When the device 100 receives an input for commanding execution of the file, the device 100 may determine, based on the metadata of the file, whether or not the file has been split into the file fragments.

In operation S420, the device 100 may determine the cloud storages 1000 storing the respective file fragments, wherein the file fragments were split from the file.

If the file is a file that has been split into file fragments, the device 100 may determine, based on file split information, the cloud storages 1000 that store the respective file fragments. The file split information may include identification information of each of the file fragments and identification information of each of the cloud storages 1000 that store the file fragments.

The device 100 may obtain the file split information stored in the device 100. The device 100 may receive the file split information from at least one among the cloud storages 1000. The device 100 may receive the file split information from a predefined external server.

In operation S430, the device 100 may receive the respective file fragments from the determined cloud storages 1000.

If a first file fragment among the file fragments is stored in at least two cloud storages 1000 among the cloud storages 1000, the device 100 may select one among the at least two cloud storages 1000, in correspondence to the first file fragment, and may receive the first file fragment from the selected cloud storage 1000.

If a second file fragment among the file fragments is stored in at least two cloud storages 1000 among the cloud storages 1000, the device 100 may receive different portions of the second file fragment from the at least two cloud storages 1000.

In operation S440, the device 100 may generate (e.g., regenerate) the file by merging the received file fragments.

In an example in which the file fragments were split from the file and then were respectively encrypted, the device 100 may decrypt the received file fragments, and may generate the file by merging the decrypted file fragments.

In an example in which the file was encrypted and then was split into the file fragments, the device 100 may generate (e.g., regenerate) the file by merging the received file fragments, and then may decrypt the generated file.

In operation S450, the device 100 may execute the generated file.

For example, the device 100 may execute a text, an image, a document, or a moving picture file, and may output information in the file.

Figure 5:
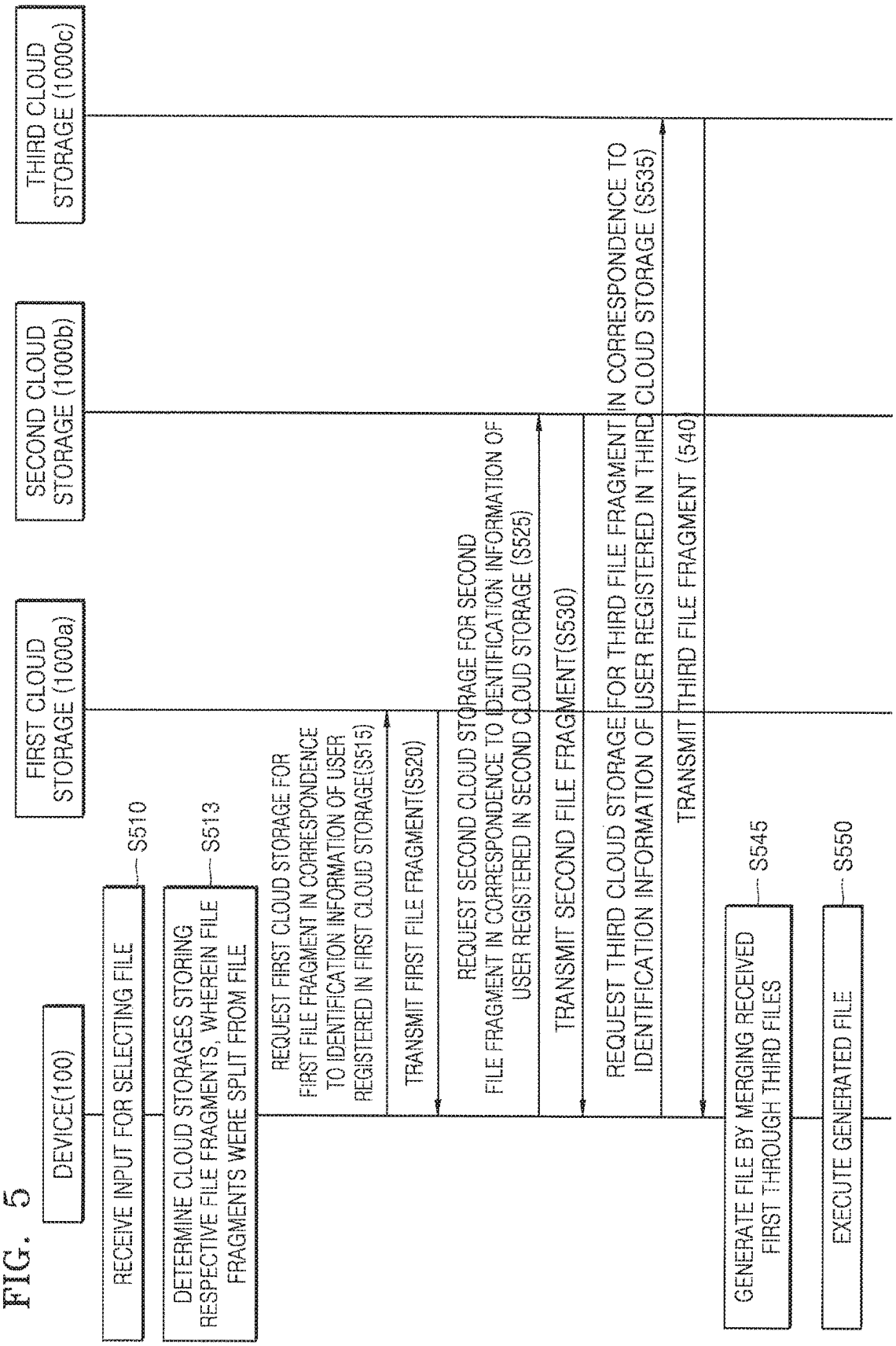
FIG. 5 is a sequence diagram illustrating an example method of receiving a plurality of file fragments of a file from the cloud storages, merging the received file fragments, and executing the file, the method being performed by the device.

FIG. 5 is a sequence diagram illustrating an example method of receiving a plurality of file fragments of a file from the cloud storages 1000, merging the received file fragments, and executing the file, the method being performed by the device 100.

In operation S510, the device 100 may receive an input for selecting the file.

For example, the device 100 may display a list of a file split into a plurality of file fragments. The list of the file may include identification information of the file. By receiving the input for selecting the file from the list, the device 100 may receive the input for selecting identification information of the file that was split into the file fragments.

In the device 100, whether or not the file has been split into the file fragments, information of the file may be stored as metadata of the file, in correspondence to the identification information of the file. When the device 100 receives an input for commanding execution of the file, the device 100 may determine, based on the metadata of the file, whether or not the file has been split into the file fragments.

In operation S513, the device 100 may determine the cloud storages 1000 storing the respective file fragments, wherein the file fragments were split from the file.

If the file is a file that has been split into the file fragments, the device 100 may determine, based on file split information, the cloud storages 1000 that store the respective file fragments.

The file split information may include identification information of the file fragments and identification information of the cloud storages 1000 that store the file fragments. For example, the identification information may indicate a first file fragment, a second file fragment, and a third file fragment, and a storage location of the first file fragment may be the first cloud storage 1000a, a storage location of the second file fragment may be the second cloud storage 1000b, and a storage location of the third file fragment may be the third cloud storage 1000c.

The device 100 may obtain the file split information stored in the device 100. The device 100 may receive the file split information from at least one among the cloud storages 1000. The device 100 may receive the file split information from a predefined external server.

In operation S515, the device 100 may request the first cloud storage 1000a for the first file fragment in correspondence to the identification information of the user registered in the first cloud storage 1000a.

The request for the first file fragment may include, for example, account information of the user registered in the cloud storage 1000, identification information of the file fragment, and identification information of a folder storing the first file fragment.

In operation S520, the first cloud storage 1000a may transmit the first file fragment to the device 100.

Based on the account information of the user which is received from the device 100, the first cloud storage 1000a may determine whether or not the user has a reception authority with respect to the requested first file fragment.

When the user has the reception authority with respect to the requested first file fragment, the first cloud storage 1000a may transmit the first file fragment to the device 100.

In operation S525, the device 100 may request the second cloud storage 1000b for the second file fragment in correspondence to the identification information of the user registered in the second cloud storage 1000b.

In operation S530, the second cloud storage 1000b may transmit the second file fragment to the device 100.

In operation S535, the device 100 may request the third cloud storage 1000c for the third file fragment in correspondence to the identification information of the user registered in the third cloud storage 1000c.

In operation S540, the third cloud storage 1000c may transmit the third file fragment to the device 100.

In operation S545, the device 100 may generate (e.g., regenerate) the file by merging the received first through third files.

The device 100 may determine an order of the file fragments, based on the file split information. The device 100 may generate the file by merging the first through third file fragments, base on the determined order of the file fragments.

In an example in which the file fragments were split from the file and then were respectively encrypted, the device 100 may decrypt the received file fragments, and may generate the file by merging the decrypted file fragments.

In an example in which the file was encrypted and then was split into the file fragments, the device 100 may generate the file by merging the received file fragments, and then may decrypt the generated file.

In operation S550, the device 100 may execute the generated file.

For example, the device 100 may execute a file viewer application and may output information in the file. For example, if the file is a document file, the device 100 may obtain document contents from the document file and may display the obtained document contents. If the file is a moving picture file, the device 100 may decode the moving picture file and may display decoded moving picture frames.

FIG. 6 is a diagram of an example table including information about the cloud storages 1000, which is stored in the device 100.

Referring to FIG. 6, the device 100 may store information 610 about the cloud storage 1000 in which a user is registered.

The information 610 about the cloud storage 1000 may include address information 620 of the cloud storage 1000, and user account information 630 of the user registered in the cloud storage 1000. The device 100 may store the address information 620 of the cloud storage 1000 and the user account information 630 of the user registered in the cloud storage 1000, in correspondence to each of the cloud storages 1000.

The address information 620 of the cloud storage 1000 may include, for example, a uniform resource locator (URL) address of the cloud storage 1000.

The user account information 630 may include identification information and a password of the user registered in the cloud storage 1000. The user account information 630 may include access information which was issued to the device 100 when the cloud storage 1000 authenticated the user based on the identification information and password information of the user which were transmitted from the device to the cloud storage 1000. The user account information 630 may include session maintenance information used to maintain a session between the device 100 and the cloud storage 1000.

FIG. 7 is a diagram illustrating an example table of file split information 700.

Referring to FIG. 7, the file split information 700 may include a file title 710 and a file size 720. The file split information 700 may include a location of file fragment 760 in the file, identification information of file fragment 770, and a storage location of file fragment 780, in correspondence to each of file fragments 730, 740, and 750.

For example, when the device 100 receives an input for commanding the device 100 to distribute and store a file "File1.avi" in the cloud storages 1000, the device 100 may split the file "File1.avi" into three file fragments, i.e., "File1_piece_1.part", "File1_piece_2.part", and "File1_piece_3.part". The device 100 may store "File1_piece_1.part" in the first cloud storage 1000a, may store "File1_piece_2.part" in the second cloud storage 1000b, and may store "File1_piece_3.part" in the third cloud storage 1000c.

When the cloud storages 1000 that correspond to the respective file fragments are requested to store the file fragments, the device 100 may store, as file split information 700, the cloud storages 1000 that store identification information of "File1_piece_1.part", "File1_piece_2.part", and "File1_piece_3.part" the respective file fragments, and the file fragments, in correspondence to identification information of the file "File1.avi".

The device 100 may store the file split information 700 in the form of file or database. The device 100 may store the file split information 700 in the device 100 or at least one among the cloud storages 1000.

Figure 8:
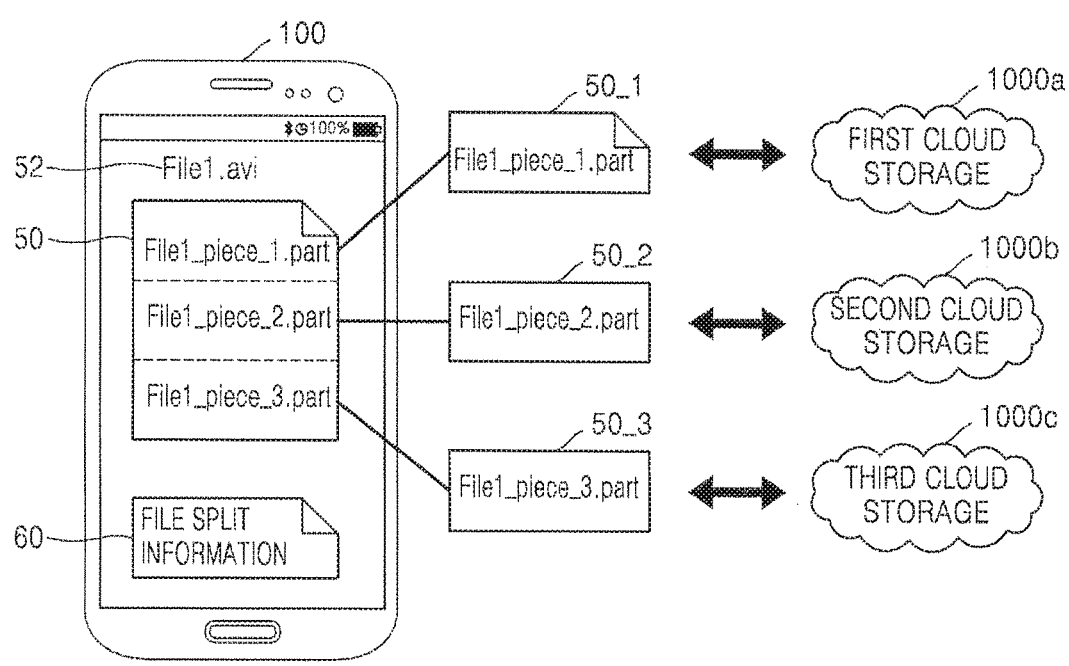
FIG. 8 and FIG. 9A are diagrams illustrating an example method of receiving a file fragment from the cloud storage, based on file split information, the method being performed by the device.

FIG. 8 is a diagram illustrating an example method of receiving a file fragment from the cloud storage 1000, based on file split information, the method being performed by the device 100.

Referring to FIG. 8, the device 100 may store file split information 60 in correspondence to identification information 52 of a file 50.

When the file 50 is a file that was split into a plurality of file fragments 50_1, 50_2, and 50_3, the device 100 may obtain the file split information 60 corresponding to the identification information 52 of the file 50. When the file split information 60 corresponding to the identification information 52 of the file 50 is obtained, the device 100 may obtain a plurality of pieces of identification information of the file fragments 50_1, 50_2, and 50_3 corresponding to the file 50, and a plurality of pieces of identification information of the cloud storages 1000 storing the file fragments 50_1, 50_2, and 50_3.

For example, the device 100 may determine, based on the file split information 60, that the identification information of the file fragments 50_1, 50_2, and 50_3 corresponding to the file 50 (i.e., "File1.avi") are "File1_piece_1.part", "File1_piece_2.part", and "File1_piece_3.part", and the cloud storage 1000 storing the file fragment 50_1 (i.e., "File1_piece_1.part") is the first cloud storage 1000a, the cloud storage 1000 storing the file fragment 50_2 (i.e., "File1_piece_2.part") is the second cloud storage 1000b, and the cloud storage 1000 storing the file fragment 50_3 (i.e., "File1_piece_3.part") is the third cloud storage 1000c.

When the identification information of the cloud storages 1000 storing the respective file fragments 50_1, 50_2, and 50_3, are obtained, the device 100 may request the cloud storages 1000, which store the respective file fragments 50_1, 50_2, and 50_3, for the respective file fragments 50_1, 50_2, and 50_3.

Figure 9A:
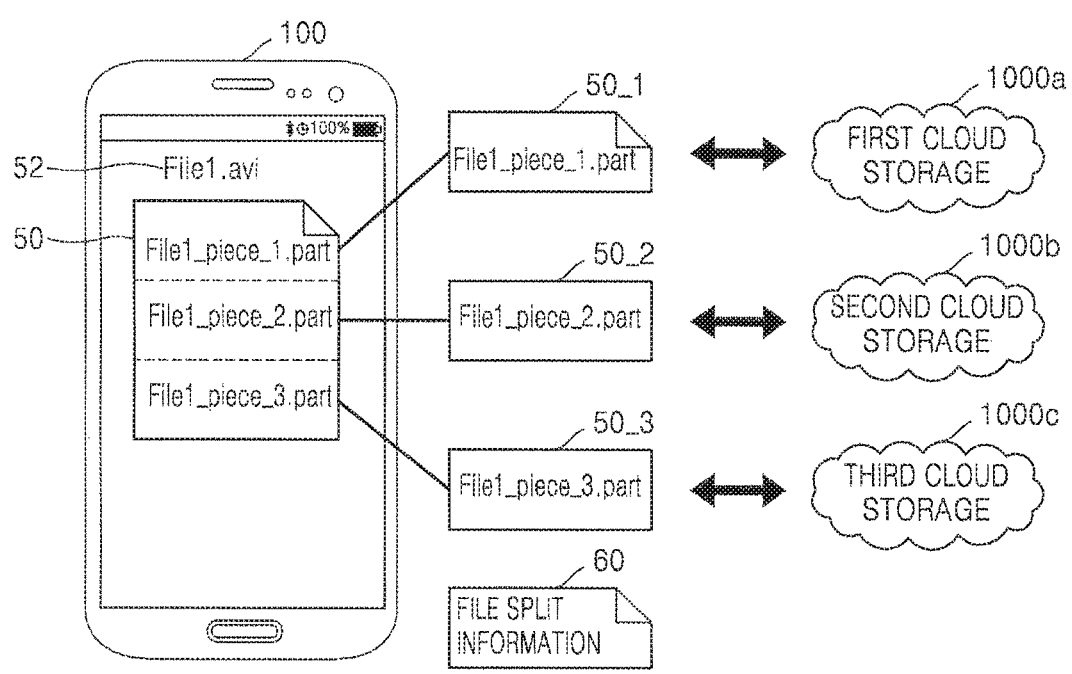

FIG. 9A is a diagram illustrating an example method of receiving file split information 60 from the cloud storage 1000, the method being performed by the device 100.

Referring to FIG. 9A, the file split information 60 may be stored in at least one among the cloud storages 1000.

The file split information 60 may be stored in the form of file in the cloud storage 1000, in correspondence to identification information of the user. In this example, a file split information file may include the file split information 60 about each of all split files among files of the user stored in the cloud storage 1000.

When the file split information 60 is stored in the form of file in the cloud storage 1000, the device 100 may store identification information of the file split information file. The device 100 may store identification information of at least one cloud storage 1000 storing the file split information file. The device 100 may receive the file split information file from the cloud storage 1000 that stores the file split information file.

The device 100 may obtain the file split information 60 about each of the files from the file split information file including the file split information 60 about each of all split files among the files of the user stored in the cloud storages 1000.

In an example embodiment, the file split information 60 may be stored in the form of database in the cloud storage 1000, in correspondence to the identification information of the user.

When the file split information 60 is stored in the form of database in the cloud storage 1000, the device 100 may store identification information of at least one cloud storage 1000 storing a file split information database The device 100 may request the cloud storage 1000 for the file split information 60 about one file, wherein the cloud storage 1000 stores the file split information database. In this example, the device 100 may transmit account information of the user and identification information of the file which are registered in the cloud storage 1000.

The request for the file split information 60 about one file is received from the device 100, the cloud storage 1000 may authenticate the user, based on the account information of the user, and may transmit the file split information 60 about one file from the file split information database to the device 100, based on the identification information of the user and the identification information of the file.

FIG. 9B is a sequence diagram illustrating an example of receiving file split information from the cloud storage 1000, and receiving a file fragment from the cloud storage 1000, based on the file split information, the method being performed by the device 100.

In operation S910, the device 100 may receive an input for selecting identification information of a file split into a plurality of file fragments.

For example, the device 100 may display a list of files split into a plurality of file fragments. By receiving the input for selecting the file from the list, the device 100 may receive the input for selecting the identification information of the file split into the file fragments.

In operation S913, the device 100 may request, for example, the third cloud storage 1000c for file split information.

The file split information may be stored in the form of file in the cloud storage 1000. In this example, a file split information file may include the file split information about each of all split files among files of a user stored in the cloud storage 1000.

When the file split information is stored in the form of file in the cloud storage 1000, the device 100 may store identification information of the file split information file. The device 100 may store identification information of at least one cloud storage 1000 storing the file split information file.

When an input for commanding execution of the file is received, the device 100 may request the cloud storage 1000 for the file split information file, based on the identification information of the file split information file and the identification information of the at least one cloud storage 1000 storing the file split information file.

If the at least one cloud storage 1000 storing the file split information file is the third cloud storage 1000c, the device 100 may request the third cloud storage 1000c for the file split information file. In this example, the device 100 may transmit the identification information of the file split information file and account information of the user registered in the third cloud storage 1000c.

In an example embodiment, file split information about respective files may be stored in the cloud storage 1000, in correspondence to identification information of the user and identification information of the files. In this example, the device 100 may request the cloud storage 1000 for the file split information corresponding to the file to be executed. In this example, the device 100 may also transmit the identification information of the file to be executed.

In operation S915, the third cloud storage 1000c may transmit the file split information to the device 100.

When the file split information is stored in the form of file in the cloud storage 1000, the third cloud storage 1000c may determine, based on the account information of the user, whether or not the user has authority to read the file split information file. If the user has the authority to read the file split information file, the third cloud storage 1000c may transmit the file split information file to the device 100.

When the file split information about the respective files are stored in the cloud storage 1000, in correspondence to the identification information of the user and the identification information of the files, the third cloud storage 1000c may transmit, to the device 100, the file split information corresponding to the identification information of the file.

In operation S920, the device 100 may determine the cloud storages 1000 storing the respective file fragments.

When the file split information file is received from the cloud storage 1000, the device 100 may obtain, from the file split information file, the file split information about the file to be executed. Based on the file split information about the file to be executed, the device 100 may determine the cloud storages 1000 storing the respective file fragments.

When the file split information about the file to be executed is received from the cloud storage 1000, the device 100 may determine, based on the file split information, the cloud storages 1000 storing the respective file fragments.

In operation S925, the device 100 may request the first cloud storage 1000a for a first file fragment, in correspondence to the identification information of the user registered in the first cloud storage 1000a. In operation S928, the first cloud storage 1000a may transmit the first file fragment to the device 100. In operation S930, the device 100 may request the second cloud storage 1000b for a second file fragment, in correspondence to the identification information of the user registered in the second cloud storage 1000b. In operation S935, the second cloud storage 1000b may transmit the second file fragment to the device 100. In operation S940, the device 100 may request the third cloud storage 1000c for a third file fragment, in correspondence to the identification information of the user registered in the third cloud storage 1000c. In operation S945, the third cloud storage 1000c may transmit the third file fragment to the device 100. In operation S950, the device 100 may generate (e.g., regenerate) the file by merging the received first through third files fragments. In operation S955, the device 100 may execute the generated file.

Figure 9C:
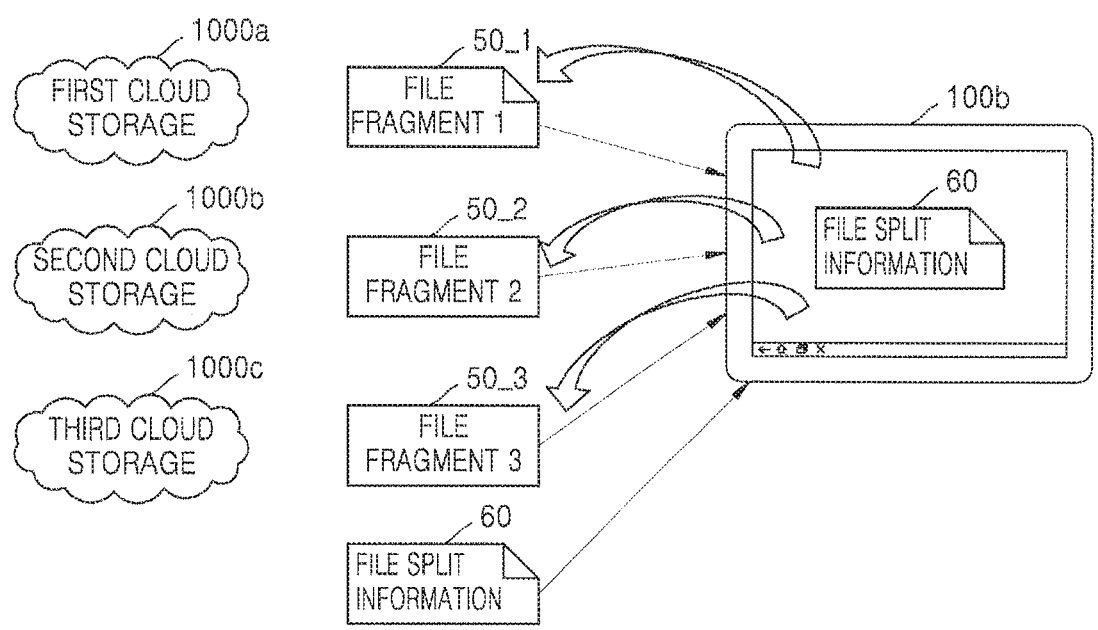
FIG. 9C is a diagram illustrating an example method of receiving file split information from a cloud storage and receiving a file fragment from the cloud storage, based on the received file split information, the method being performed by another device of a user.

FIG. 9C are diagrams illustrating an example method of receiving file split information from the cloud storage 1000 and receiving a file fragment from the cloud storage 1000, based on the received file split information, the method being performed by another device 100b of a user.

Referring to FIG. 9C, the other device 100b of the user may obtain the file split information 60 stored in the cloud storage 1000, and may receive a plurality of file fragments from the cloud storage 1000, based on the obtained file split information 60.

The other device 100b from among devices of the user may be a device that did not store the file fragments in the cloud storage 1000. The other device 100b of the user may store account information of the user which is registered in the cloud storages 1000.

The other device 100b of the user may receive the file split information 60 from the cloud storage 1000. For example, the other device 100b of the user may request, based on the account information of the user, the cloud storage 1000 for a list of files of the user stored in the cloud storage 1000. When the request for the list of files is received, the cloud storage 1000 may authenticate the user, based on the account information of the user received from the other device 100b of the user, and may transmit the list of files of the user to the other device 100b of the user. The list of files of the user may include identification information of the file split information 60. The other device 100b of the user may request the cloud storage 1000 for a file split information file, based on the identification information of the file split information 60, and may receive the file split information file.

The other device 100b of the user may obtain, from the file split information file, the list of files that were distributed and stored in the cloud storages 1000. The other device 100b of the user may display the list of files that were distributed and stored in the cloud storages 1000.

When an input for executing one from the list of files distributed and stored in the cloud storages 1000 is received, the other device 100b of the user may obtain, from the file split information file, identification information of the file fragments of the file to be executed, and identification information of the cloud storages 1000 storing the file fragments, respectively. Based on the identification information of the file fragments, and the identification information of the cloud storages 1000 storing the respective file fragments, the other device 100b of the user may request the cloud storages 1000 for the respective file fragments stored in the cloud storages 1000.

Figure 10:
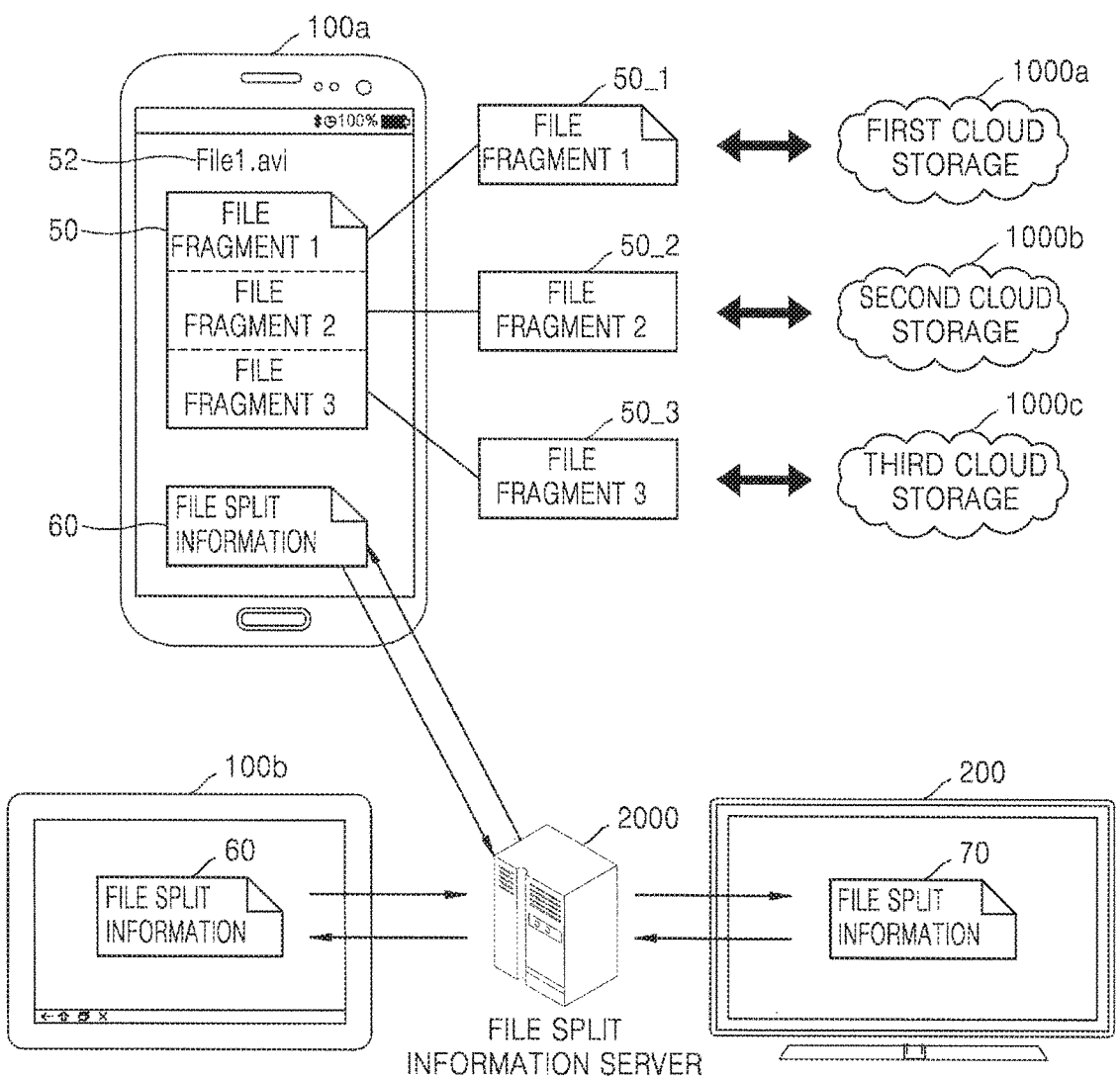
FIG. 10 is a diagram illustrating an example method of receiving file split information from an external server, and receiving a plurality of file fragments from the cloud storages, based on the file split information, the method being performed by a device.

FIG. 10 is a diagram illustrating an example method of receiving file split information 60 from an external server, and receiving a plurality of file fragments from the cloud storages 1000, based on the file split information 60, the method being performed by a device 100*a*.

Referring to FIG. 10, the file split information 60 may be stored in a file split information server 2000.

The device 100*a* may request the file split information server 2000 to store the file split information 60 about a file 50 in correspondence to identification information of a user registered in the file split information server 2000. The device 100*a* may receive the file split information 60 corresponding to the file 50 from the file split information server 2000.

The file split information server 2000 may store the file split information 60 of the user, in correspondence to identification information of a file and the identification information of the user registered in the file split information server 2000. The file split information server 2000 may obtain the file split information 60 of the user, based on the identification information of the user and identification information of a file, and may transmit the obtained file split information 60 to the device 100*a*.

Another device 100*b* of the user may receive the file split information 60 from the file split information server 2000, based on the identification information of the user and identification information of a file.

A device 200 of another user may store file split information 70 about a file of the other user in the file split information server 2000 or may receive the file split information 70 from the file split information server 2000, based on identification information of the file and identification information of the other user registered in the file split information server 2000.

FIGS. 11A through 11E are diagrams illustrating an example method of displaying a list of files of a user when the files are distributed and stored, the method being performed by the device 100.

Figure 11A:
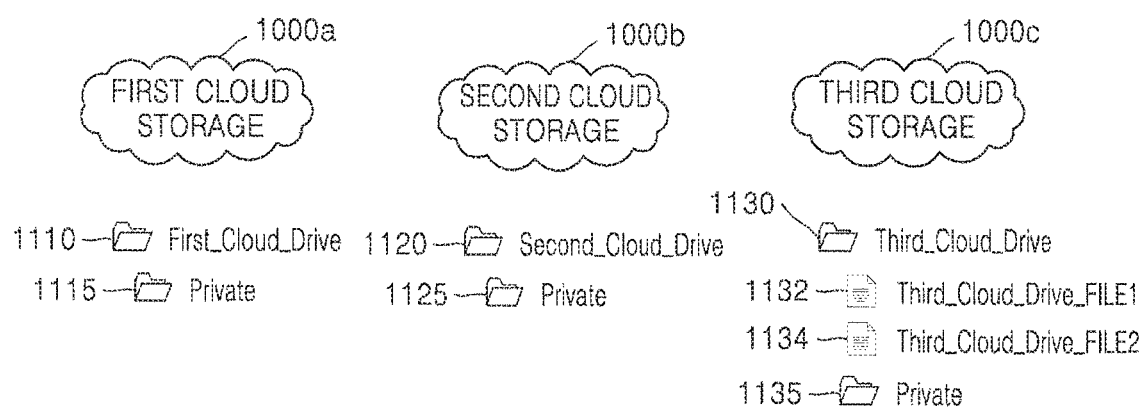
FIGS. 11A through 11E are diagrams illustrating an example method of displaying a list of files of a user when the files are distributed and stored, the method being performed by the device.

Referring to FIG. 11A, the files of the user may be stored in the first cloud storage 1000*a*, the second cloud storage 1000*b*, and the third cloud storage 1000*c*.

For example, the file stored in the first cloud storage 1000*a* may be stored in a "First_Cloud_Drive" folder 1110. The file stored in the second cloud storage 1000*b* may be stored in a "Second_Cloud_Drive" folder 1120. The file stored in the third cloud storage 1000*c* may be stored in a "Third_Cloud_Drive" folder 1130. The third cloud storage 1000*c* may also store a "Third_Cloud_Drive_FILE1" file 1132 and a "Third_Cloud_Drive_FILE2" file 1134.

The file fragments and file split information of the file of the user which are stored in one cloud storage 1000 may be all stored in a predefined folder. In addition, identification information of folders in the cloud storages 1000 in which file fragments of a same user are stored may be equal to each other. For example, identification information of a folder 1115 of the first cloud storage 1000*a* in which the file fragment of the user is stored, identification information of a folder 1125 of the second cloud storage 1000*b* in which the file fragment of the user is stored, and identification information of a folder 1135 of the third cloud storage 1000*c* in which the file fragment of the user is stored may all be "Private".

Figure 11B:
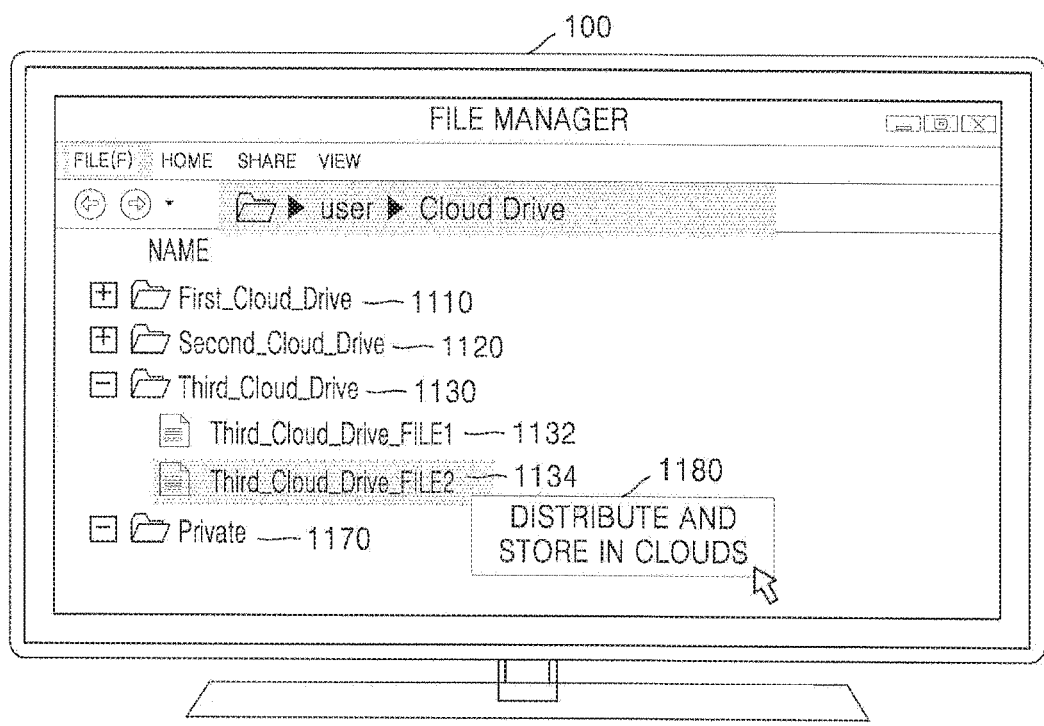

Referring to FIG. 11B, the device 100 may display a list of files stored in the cloud storage 1000.

For example, when an input for displaying the list of the files stored in the cloud storage 1000 is received, the device 100 may request the cloud storage 1000 for the list of the files and may receive the list of the files. When an event indicating a file has been added, deleted, or updated in the cloud storage 1000 is received from the cloud storage 1000, the device 100 may request the cloud storage 1000 for the list of the files and may receive the list of the files. The device 100 may also receive, from the cloud storage 1000, information about a hierarchical structure of the files stored in the cloud storage 1000.

The list of the files and the information about the hierarchical structure of the files are received, the device 100 may display a list of folders and the files stored in the cloud storages 1000 shown in FIG. 11A.

When an input for selecting, from the list of the files, the "Third_Cloud_Drive_FILE2" file 1134 stored in the third cloud storage 1000*c* is received, the device 100 may display a menu 1180 for distributing and storing the "Third_Cloud_Drive_FILE2" file 1134 in the cloud storage 1000. When an input for selecting the menu 1180 for distributing and storing the "Third_Cloud_Drive_FILE2" file 1134 in the cloud storage 1000 is received, the device 100 may split the "Third_Cloud_Drive_FILE2" file 1134 into three file fragments. Then, the device 100 may determine file names of the three file fragments as "Third_Cloud_Drive_FILE2.part1", "Third_Cloud_Drive_FILE2.part2" and "Third_Cloud_Drive_FILE2.part3".

When the device 100 and the cloud storage 1000 synchronize only a plurality of items of metadata of the files, the device 100 may request the cloud storage 1000 for content data of the "Third_Cloud_Drive_FILE2" file 1134 and may receive the content data, and may split the content data of the "Third_Cloud_Drive_FILE2" file 1134 into three file fragments.

When the device 100 and the cloud storage 1000 synchronize both the plurality of items of metadata of the files and a plurality of items of content data of the files, the content data of the "Third_Cloud_Drive_FILE2" file 1134 may be stored in the device 100. In this example, the device 100 may split the content data of the "Third_Cloud_Drive_FILE2" file 1134, which is stored in the device 100, into three file fragments.

The device 100 may determine the cloud storages 1000 to store respective split file fragments. The device 100 may request the cloud storages 1000 to store the respective file fragments in "Private" folders 1115, 1125, and 1135, wherein the cloud storages 1000 are to store the respective file fragments. The device 100 may generate file split information with respect to the "Third_Cloud_Drive_FILE2" file 1134 as, for example, a "replica_info.dat" file, and may request at least one cloud storage 1000 to store the "replica_info.dat" file in the "Private" folder.

The device 100 may request the third cloud storage 1000*c*, which stores the "Third_Cloud_Drive_FILE2" file 1134, to delete the "Third_Cloud_Drive_FILE2" file 1134.

Figure 11C:
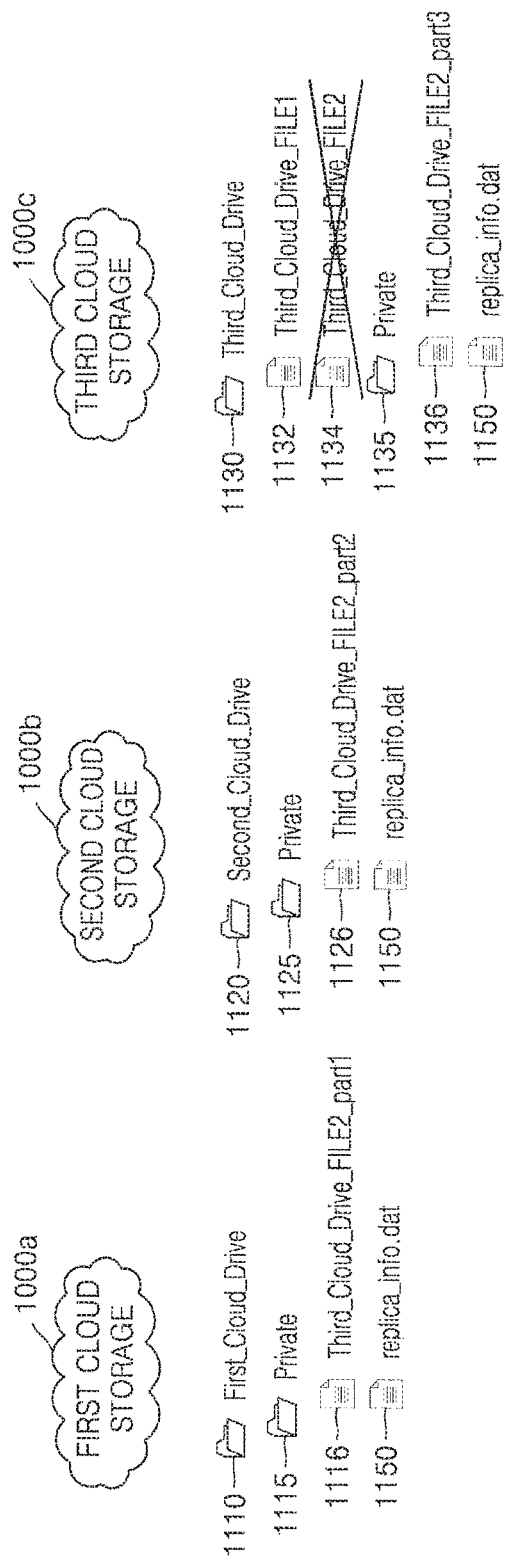

Referring to FIG. 11C, when a request for storing a file fragment is received from the device 100, the first cloud storage 1000*a* may store a "Third_Cloud_Drive_FILE2_part1" file fragment 1116 in the "Private" folder 1115 in the first cloud storage 1000*a*. The second cloud storage 1000*b* may store a "Third_Cloud_Drive_FILE2_part1" file fragment 1126 in the "Private" folder 1125 in the second cloud storage 1000*b*. The third cloud storage 1000*c* may store a "Third_Cloud_Drive_FILE2_part1" file fragment 1136 in the "Private" folder 1135 in the third cloud storage 1000*c*.

Also, when a request for storing file split information is received from the device 100, the first, second, and third cloud storages 1000*a*, 1000*b*, and 1000*c* may store a "replica_info.dat" file 1150 including file split information of the "Third_Cloud_Drive_FILE2" file 1134 in the "Private" folders 1115, 1125, and 1135, respectively.

When a request for deleting the "Third_Cloud_Drive_FILE2" file 1134 is received from the device 100, the third cloud storage 1000c may delete the "Third_Cloud_Drive_FILE2" file 1134.

Figure 11D:
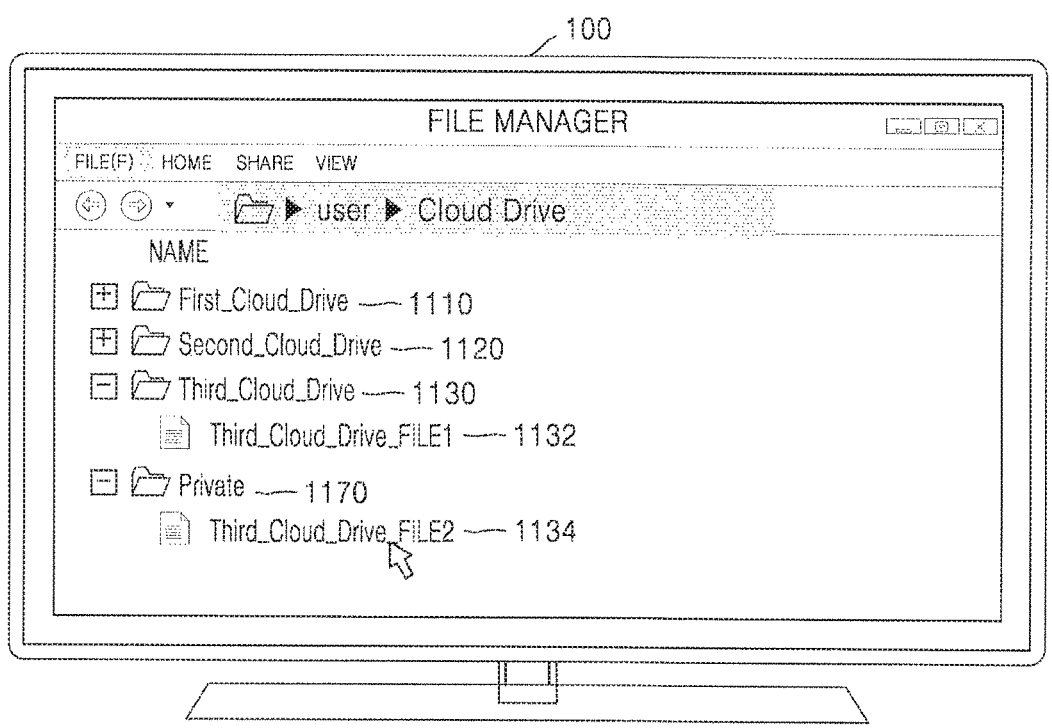

Referring to FIG. 11D, when a file is distributed and stored in the cloud storages 1000, the device 100 may change a location of the "Third_Cloud_Drive_FILE2" file 1134 from the "Third_Cloud_Drive" folder 1130 to a predefined "Private" folder 1170.

Figure 11E:
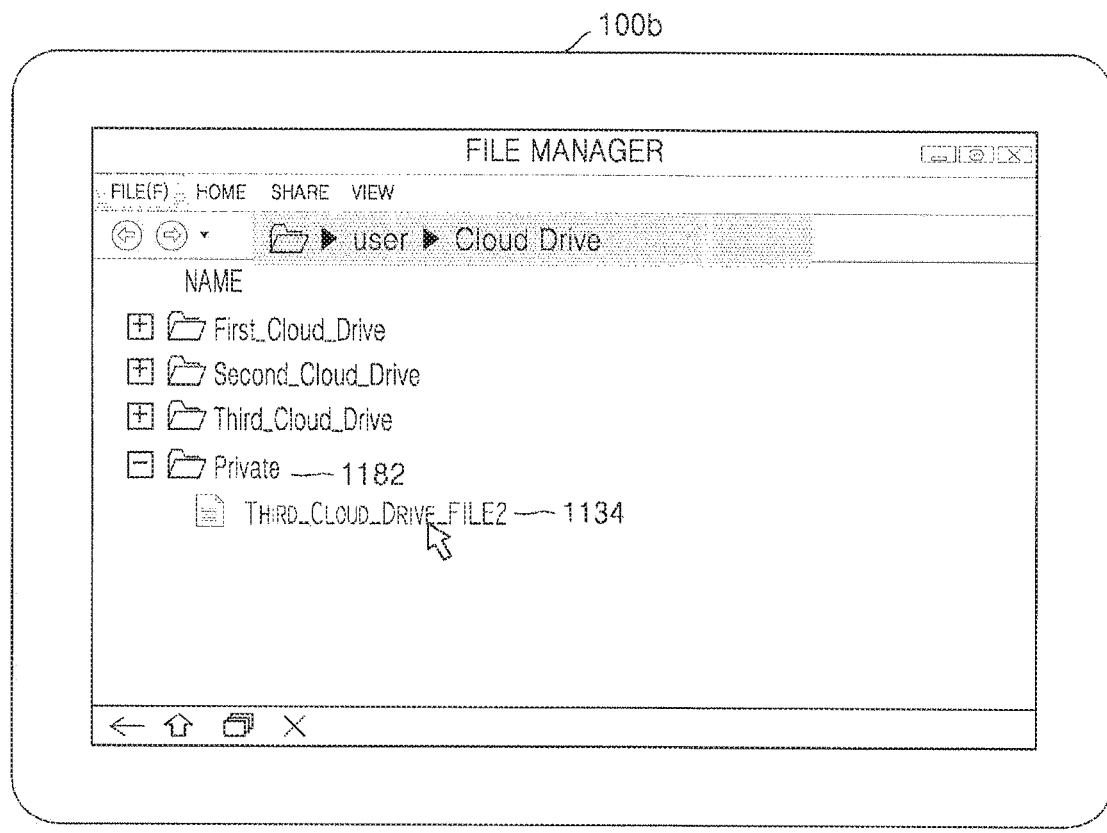

Referring to FIG. 11E, the other device 100b of the user may receive, from the cloud storage 1000, a list of files that are distributed and stored in the cloud storage 1000, and may display the list of the files. The other device 100b from among devices of the user may indicate a device that did not store the file fragments in the cloud storage 1000.

The other device 100b of the user may receive, from the cloud storage 1000, the list of the files that are distributed and stored in the cloud storage 1000.

For example, when an input for displaying the list of the files that are distributed and stored in the cloud storage 1000 is received, the other device 100b of the user may request at least one cloud storage 1000 from among the cloud storages 1000 for the "replica_info.dat" file 1150.

For example, when an event indicating an update of the "replica_info.dat" file 1150 is received from the cloud storage 1000, the other device 100b of the user may request the cloud storage 1000, which transmitted the event, for an updated "replica_info.dat" file 1150.

When the "replica_info.dat" file 1150 is received from at least one cloud storage 1000, the other device 100b of the user may obtain, from the "replica_info.dat" file 1150, a file name of a file that is distributed and stored. The other device 100b of the user may display a list of the file, based on the file name of the file. For example, the other device 100b of the user may display a file name of the "Third_Cloud_Drive_FILE2" file 1134 in a "Private" folder 1182. In this case, the other device 100b of the user may display the "Third_Cloud_Drive_FILE2" file 1134 using, for example, a shade, a color, or an image so as to indicate that the "Third_Cloud_Drive_FILE2" file 1134 is not actually stored in the other device 100b, and only metadata of the "Third_Cloud_Drive_FILE2" file 1134 is stored in the other device 100b.

When an input for selecting the "Third_Cloud_Drive_FILE2" file 1134 is received, the other device 100b of the user may obtain, from the "replica_info.dat" file 1150, file split information of the "Third_Cloud_Drive_FILE2" file 1134. The other device 100b may receive, based on the file split information of the "Third_Cloud_Drive_FILE2" file 1134, file fragments corresponding to the "Third_Cloud_Drive_FILE2" file 1134 from the cloud storages 1000, respectively. The other device 100b of the user may regenerate the "Third_Cloud_Drive_FILE2" file 1134 by merging the received file fragments, and may execute the regenerated "Third_Cloud_Drive_FILE2" file 1134.

Figure 12A:
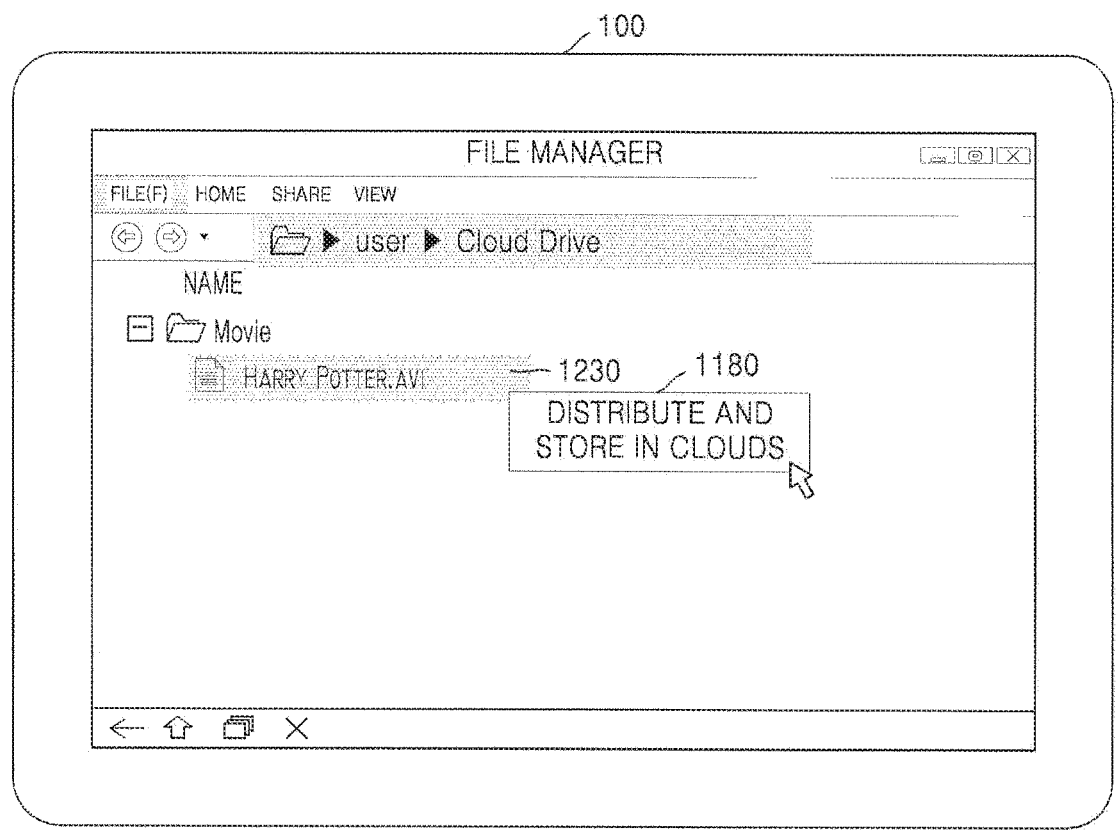
FIGS. 12A and 12B are diagrams illustrating an example method of splitting a file stored only in the device into a plurality of file fragments, distributing and storing the file fragments in the cloud storages, and displaying the distributed-and-stored file, the method being performed by the device.
Figure 12B:
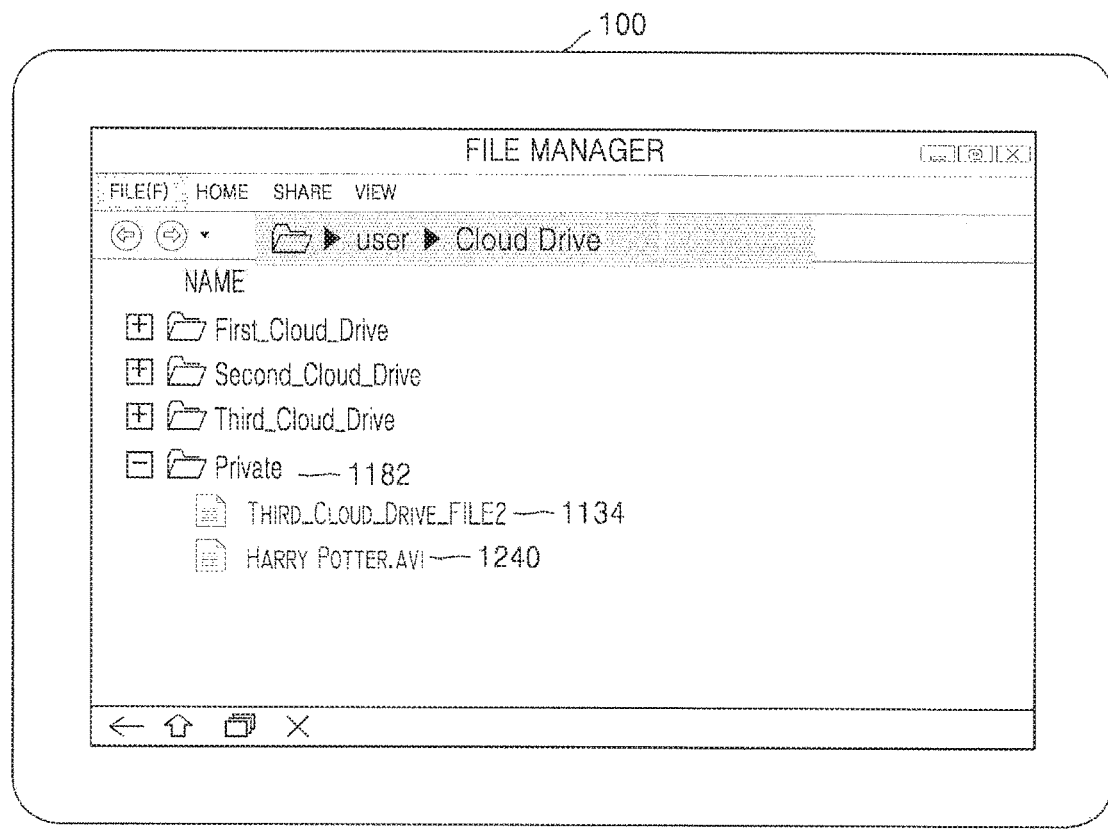

FIGS. 12A and 12B are diagrams illustrating an example method of splitting a file stored only in the device 100 into a plurality of file fragments, distributing and storing the file fragments in the cloud storages 1000, and displaying the distributed-and-stored file, the method being performed by the device 100.

Referring to FIG. 12A, according to a received input, the device 100 may split a file stored only in the device 100 and may store the split file in the cloud storages 1000.

For example, the device 100 may store a "Harry Potter.avi" file 1230 in a "Movie" folder. The "Harry Potter.avi" file 1230 may not be stored in the cloud storages 1000 in which a user of the device 100 is registered.

When an input for selecting the "Harry Potter.avi" file 1230 is received, the device 100 may display the menu 1180 for distributing and storing the "Harry Potter.avi" file 1230 in the cloud storages 1000. When an input for selecting the menu 1180 is received, the device 100 may split the "Harry Potter.avi" file 1230 into a plurality of file fragments. The device 100 may distribute and store the file fragments in the cloud storages 1000.

Referring to FIG. 12B, when file fragments are distributed and stored in the cloud storages 1000, the device 100 may delete a file from the device 100.

For example, when the file fragments are distributed and stored in the cloud storages 1000, the device 100 may delete content data of the "Harry Potter.avi" file 1230 from the device 100, and may display the "Harry Potter.avi" file 1230 as a file stored in the cloud storages 1000. For example, the device 100 may store identification information of the "Private" folder 1182 as a folder, from among a plurality of folders in the device 100, which stores distributed-and-stored files. The device 100 may change a location of the "Harry Potter.avi" file 1230 so as to allow a file name of the "Harry Potter.avi" file 1230 to be shown in the "Private" folder 1182.

In an example embodiment, the device 100 may not delete the content data of the "Harry Potter.avi" file 1230.

Figure 13:
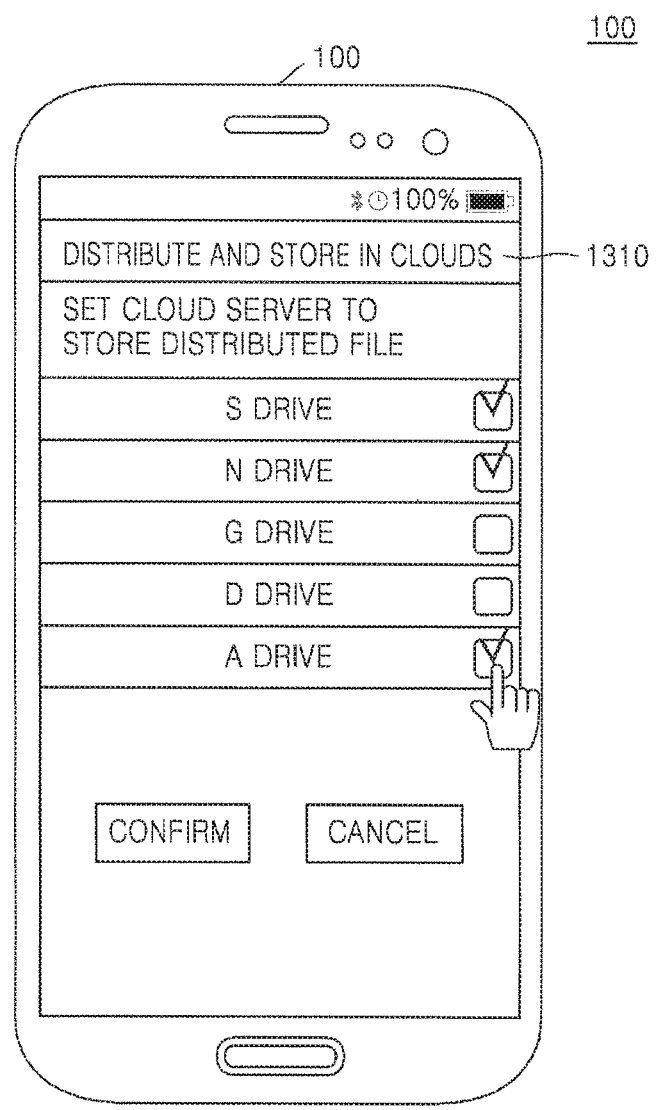
FIG. 13 is a diagram illustrating an example method of providing a user interface for receiving an input of selecting the cloud storages to which the device 100 distributes and stores a file, the method being performed by the device.

FIG. 13 is a diagram illustrating an example method of providing a user interface for receiving an input of selecting the cloud storages 1000 to which the device 100 distributes and stores a file, the method being performed by the device 100.

Referring to FIG. 13, the device 100 may provide the user interface for receiving the input of selecting the cloud storages 1000 to which the device 100 distributes and stores the file.

For example, when an input for selecting a menu for selecting a file and distributing and storing the selected file is received, the device 100 may display a menu 1310 for selecting the cloud storages 1000 to which the selected file is to be distributed and stored.

The menu 1310 for selecting the cloud storages 1000 to which the selected file is to be distributed and stored may include identification information of the cloud storages 1000 in which a user of the device 100 is registered, and checkbox buttons for selecting the respective cloud storages 1000.

When an input for selecting one or more checkbox buttons and touching a confirm button is received, the device 100 may determine the cloud storages 1000 in which to store respective file fragments, wherein the checkbox buttons of the determined cloud storages 1000 are selected.

Figure 14A:
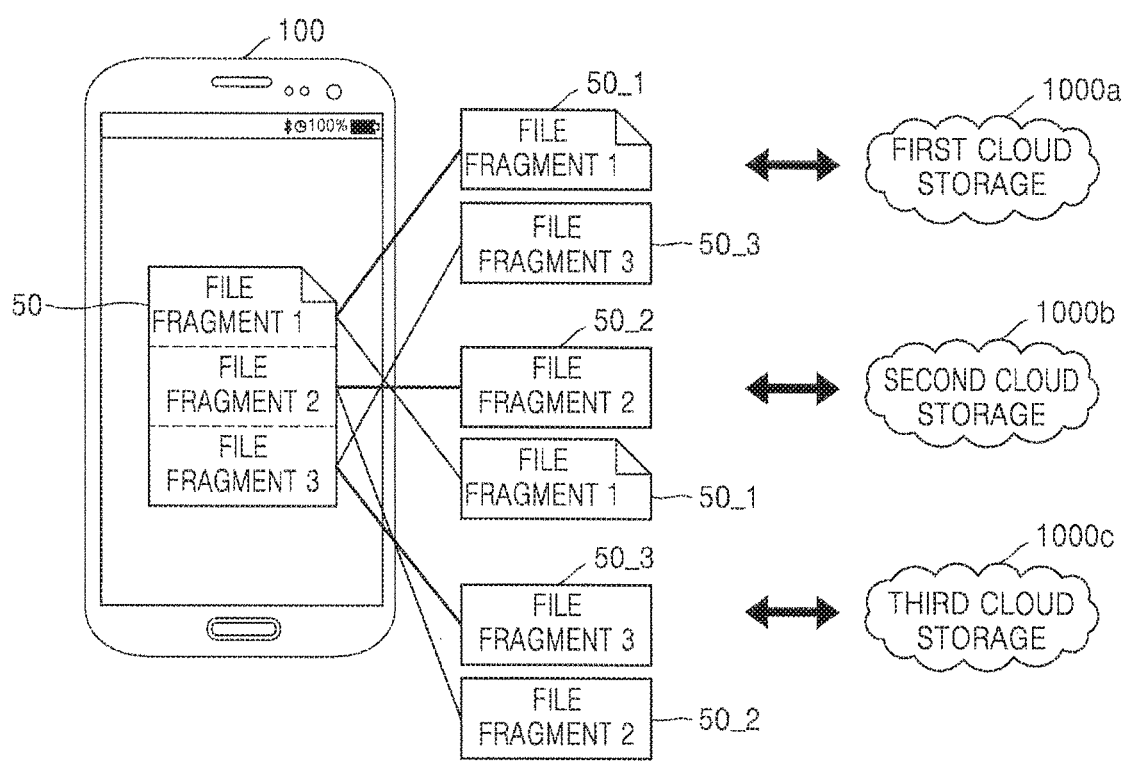

FIGS. 14A and 14B are diagrams illustrating and example method of storing a same file fragment in the cloud storages 1000, the method being performed by the device 100.

Referring to FIG. 14A, the device 100 may request the cloud storages 1000 to store the same file fragment.

The device 100 may split a file into a plurality of file fragments, and may determine the cloud storages 1000 to store the file fragments. In this example, the device 100 may set some cloud storages 1000 from among the cloud storages 1000 to store a same file fragment from among the file fragments.

For example, the device 100 may split a file 50 into a file fragment 1 50_1, a file fragment 2 50_2, and a file fragment 3 50_3. The device 100 may determine the first cloud storage 1000a and the second cloud storage 1000b as cloud storages to store the file fragment 1 50_1, may determine the second cloud storage 1000b and the third cloud storage 1000c as cloud storages to store the file fragment 2 50_2, and may determine the first cloud storage 1000a and the third cloud storage 1000c as cloud storages to store the file fragment 3 50_3.

When the cloud storages 1000 to store the file fragments are determined, the device 100 may request the cloud storages 1000, which are determined to store a same file fragment, to store the same file fragment.

Referring to FIG. 14B, when at least two cloud storages 1000 are determined with respect to a same file fragment, the device 100 may generate file split information 700 in which the cloud storages 1000 are determined as storage locations 780 for each of a file fragment 1 730, a file fragment 2 740, and a file fragment 3 750.

Figure 14C:
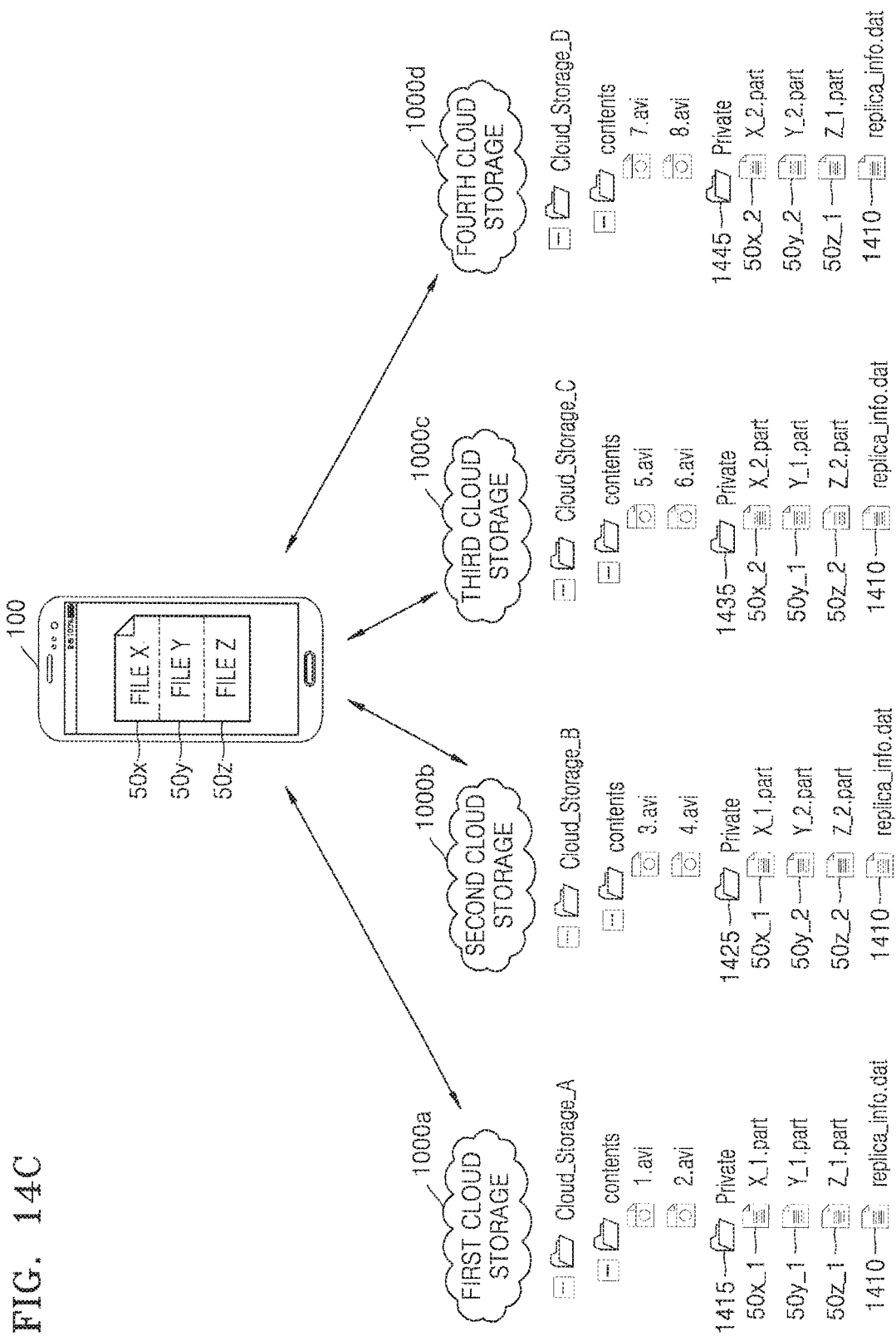

FIG. 14C is a diagram illustrating an example in which a plurality of file fragments when the file fragments corresponding a plurality of files are stored in the cloud storages 1000.

Referring to FIG. 14C, the device 100 may split a file X 50x, a file Y 50y, and a file Z 50z into a plurality of file fragments, and may store the file fragments in the cloud storages 1000, in such a manner that a same file fragment may be stored in the cloud storages 1000.

For example, the device 100 may split the file X 50x into an X_1.part file fragment 50x_1 and an X_2.part file fragment 50x_2. The device 100 may split the file Y 50y into an Y_1.part file fragment 50y_1 and an Y_2.part file fragment 50y_2. The device 100 may split the file Z 50z into a Z_1.part file fragment 50z_1 and a Z_2.part file fragment 50z_2. The device 100 may store the X_1.part file fragment 50x_1 in the first cloud storage 1000a and the second cloud storage 1000b. The device 100 may store the X_2.part file fragment 50x_2 in the third cloud storage 1000c and a fourth cloud storage 1000d. The device 100 may store the Y_1.part file fragment 50y_1 in the first cloud storage 1000a and the third cloud storage 1000c. The device 100 may store the Y_2.part file fragment 50y_2 in the second cloud storage 1000b and the fourth cloud storage 1000d. The device 100 may store the Z_1.part file fragment 50z_1 in the first cloud storage 1000a and the fourth cloud storage 1000d. The device 100 may store the Z_2.part file fragment 50z_2 in the second cloud storage 1000b and the third cloud storage 1000c.

The device 100 may generate a "reflica_info.dat" file 1410 as file split information of each of the file X 50x, the file Y 50y, and the file Z 50z. The "reflica_info.dat" file 1410 may include the file split information of the file X 50x, the file Y 50y, and the file Z 50z which correspond to identification information of the file X 50x, the file Y 50y, and the file Z 50z, respectively.

The device 100 may store the "reflica_info.dat" file 1410, which is a file split information file, in the first through fourth cloud storages 1000a through 1000d.

Figure 14D:
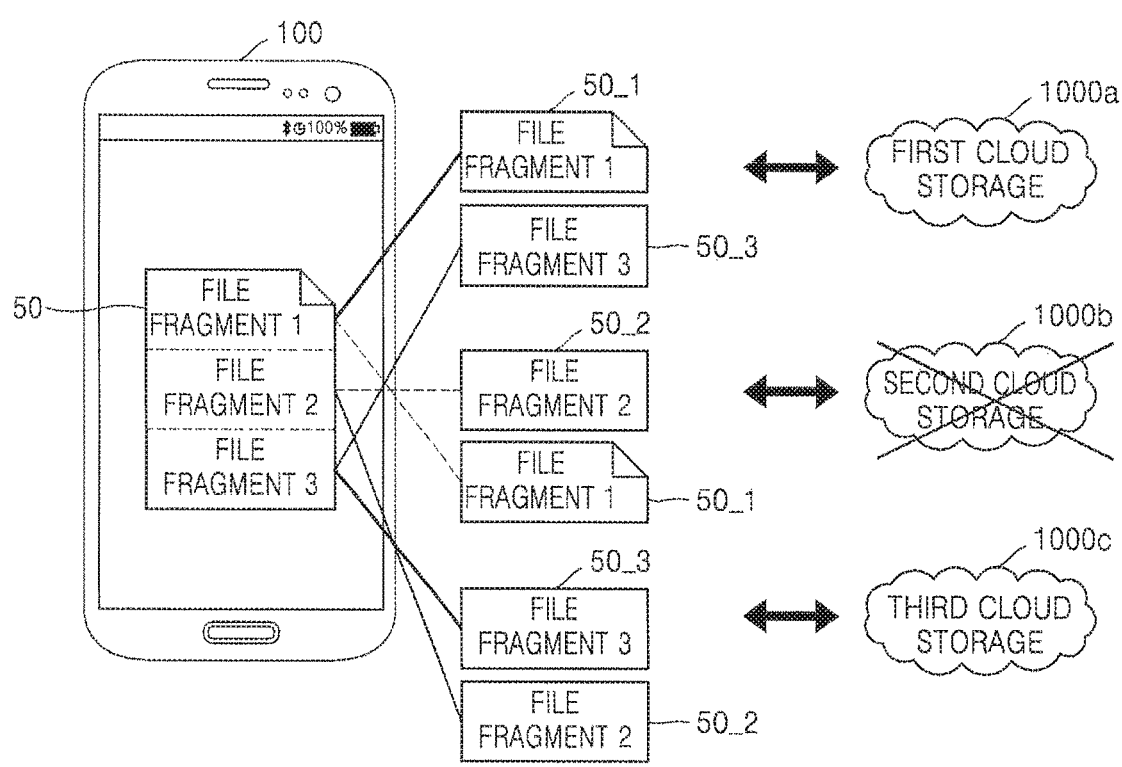

FIG. 14D is a diagram illustrating an example method of receiving a file fragment from the cloud storages 1000, when the cloud storage 1000 from among the cloud storages 1000 is not operable, the method being performed by the device 100.

Referring to FIG. 14D, in a case where first through third file fragments 50_1, 50_2, and 50_3 of a file 50 are stored in multiple locations in the first through third cloud storages 1000a through 1000c, and the second cloud storage 1000b is not operable, the device 100 may generate the file 50 by receiving the first through third file fragments 50_1, 50_2, and 50_3 from the first cloud storage 1000a and the third cloud storage 1000c.

For example, the device 100 may obtain all of the first through third file fragments 50_1, 50_2, and 50_3 by receiving the first file fragment 50_1 and the third file fragment 50_3 from the first cloud storage 1000a, and receiving the second file fragment 50_2 from the third cloud storage 1000c.

Figure 15:
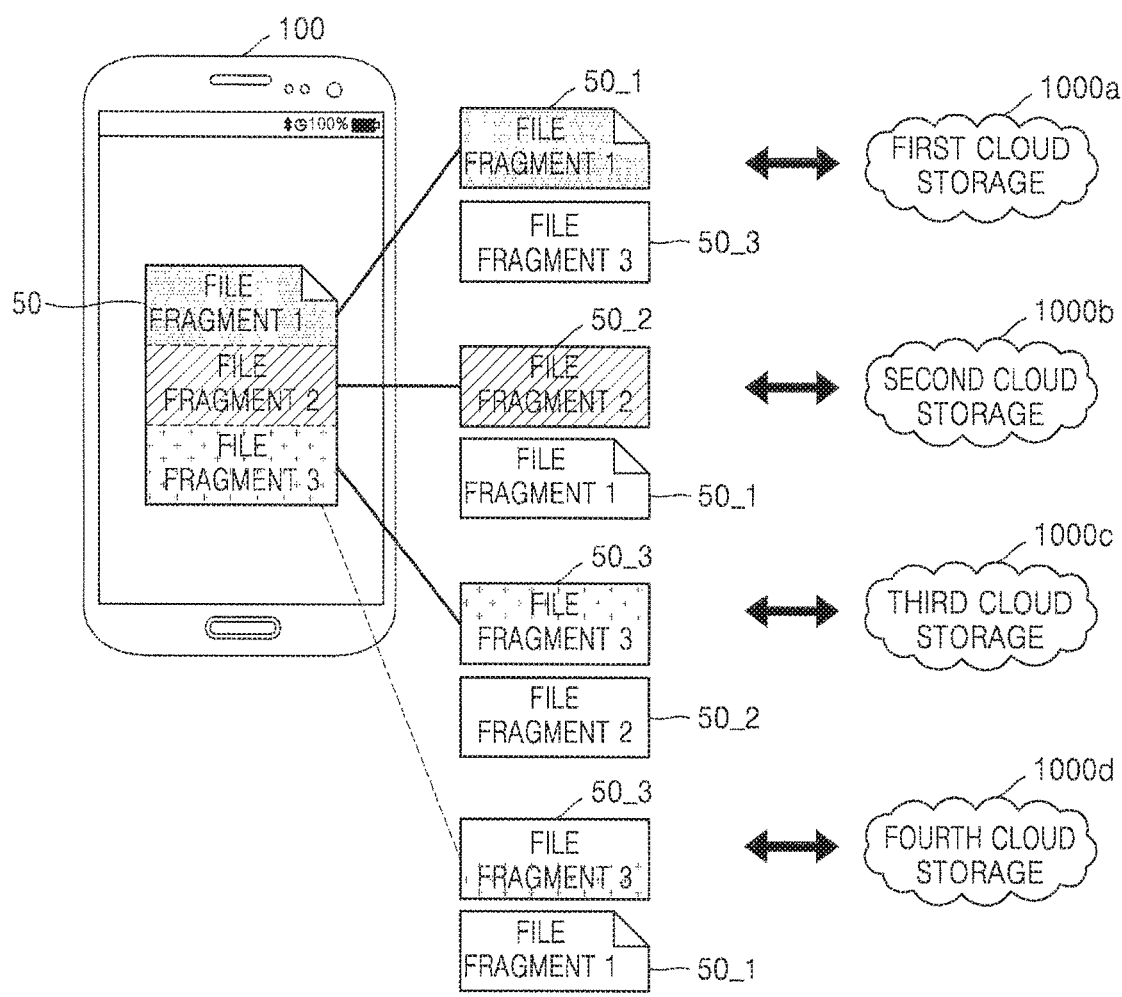
FIG. 15 is a diagram illustrating an example method of receiving a same file fragment from the cloud storages, when the same file fragment is stored in the cloud storages, the method being performed by the device.

FIG. 15 is a diagram illustrating an example method of receiving a same file fragment from the cloud storages 1000, when the same file fragment is stored in multiple locations the cloud storages 1000, the method being performed by the device 100.

Referring to FIG. 15, the device 100 may receive the same file fragment from multiple locations in the cloud storages 1000.

For example, the device 100 may determine to receive a portion of a file fragment 3 50_3 from the third cloud storage 1000c and to another portion of the file fragment 3 50_3 from the fourth cloud storage 1000d. The device 100 may request the third cloud storage 1000c for the portion of the file fragment 3 50_3, and may request the fourth cloud storage 1000d for the other portion of the file fragment 3 50_3.

In this example, the device 100 may transmit, to the cloud storages 1000, both identification information of the same file fragment and location information of the same file fragment in data. The device 100 may receive the file fragment 3 50_3 from both the third cloud storage 1000c and the fourth cloud storage 1000d.

Figure 16A:
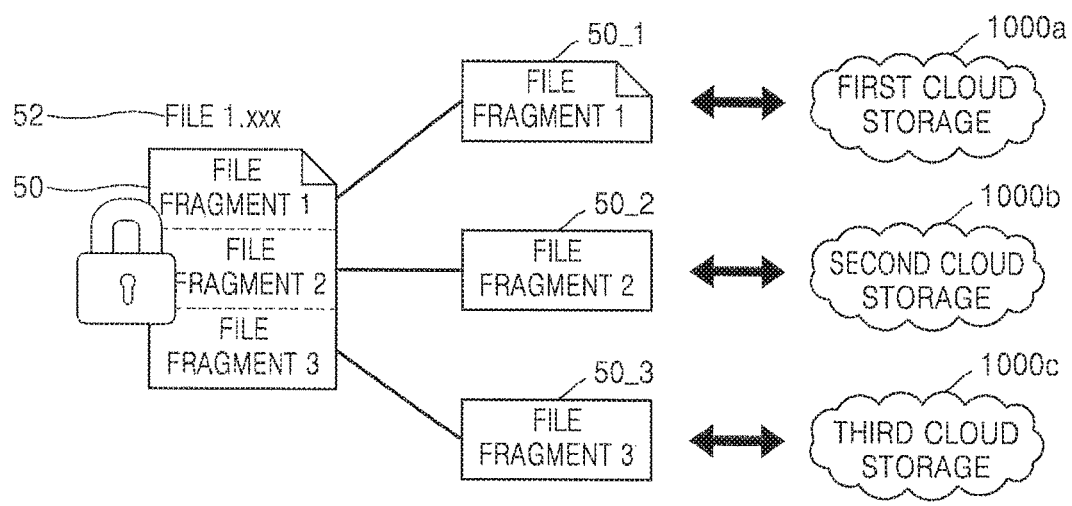

FIGS. 16A and 16B are diagrams illustrating an example method of encrypting a file, the method being performed by the device 100.

Referring to FIG. 16A, the device 100 may encrypt a file 50 before the device 100 splits the file 50 into a plurality of file fragments. After the device 100 encrypts the file 50, the device 100 may split the encrypted file 50 into a plurality of file fragments 50_1, 50_2, and 50_3.

The device 100 may receive the file fragments 50_1, 50_2, and 50_3 corresponding to the file 50 from the first through third cloud storages 1000a through 1000c. The device 100 may reconstruct the encrypted file 50 by merging the received file fragments 50_1, 50_2, and 50_3. After the device 100 reconstructs the encrypted file 50, the device 100 may decrypt the reconstructed file 50 and may execute the decrypted file 50.

Referring to FIG. 16B, when a file is encrypted and then the encrypted file is split into a plurality of file fragments, the device 100 may store an encryption key 1610, which was used in encryption, as file split information 700 in correspondence to identification information of the file.

In an example embodiment, the encryption key 1610 may be separately stored from the file split information 700. For example, the encryption key 1610 may be separated from the file split information 700, and may be stored in the device 100 or in the cloud storage 1000.

Figure 17A:
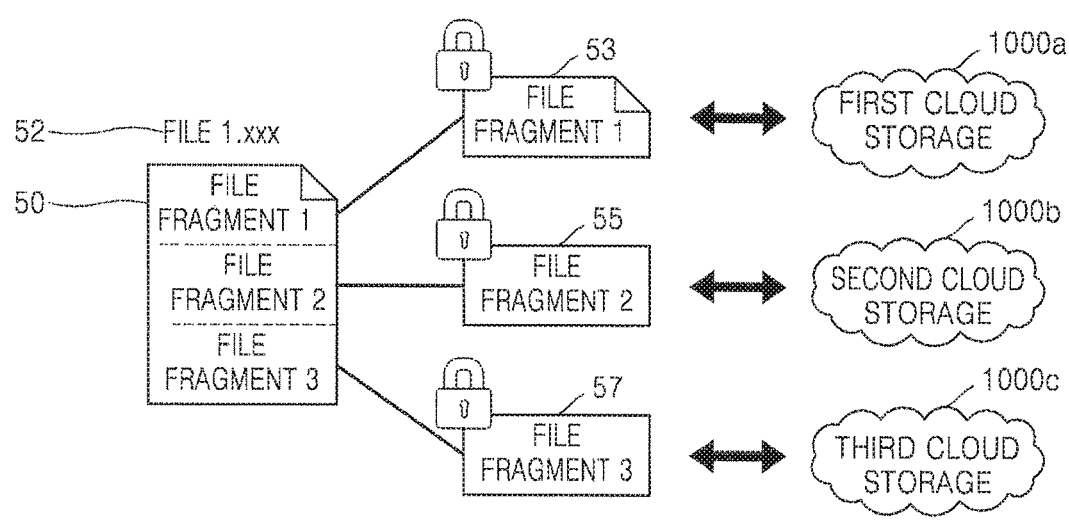

FIGS. 17A and 17B are diagrams illustrating an example method of encrypting a file, the method being performed by the device 100.

Referring to FIG. 17A, the device 100 may split a file 50 into a plurality of file fragments 53, 55, and 57 and may encrypt each of the split file fragments 53, 55, and 57. When each of the split file fragments 53, 55, and 57 is encrypted, the device 100 may store the encrypted file fragments 53, 55, and 57 in the first through third cloud storages 1000a through 1000c.

The device 100 may receive the encrypted file fragments 53, 55, and 57 corresponding to the file 50 from the first through third cloud storages 1000a through 1000c. The device 100 may decrypt the received encrypted file fragments 53, 55, and 57, may generate (e.g., reconstruct) the file 50 by merging the decrypted file fragments 53, 55, and 57, and may execute the generated file 50.

Referring to FIG. 17B, when the device 100 splits a file into a plurality of file fragments and encrypts each of the file fragments, the device 100 may store encryption keys 1710, 1720, and 1730, which were used in encryption, as file split information 700, in correspondence to identification information of the respective file fragments.

Figure 18A:
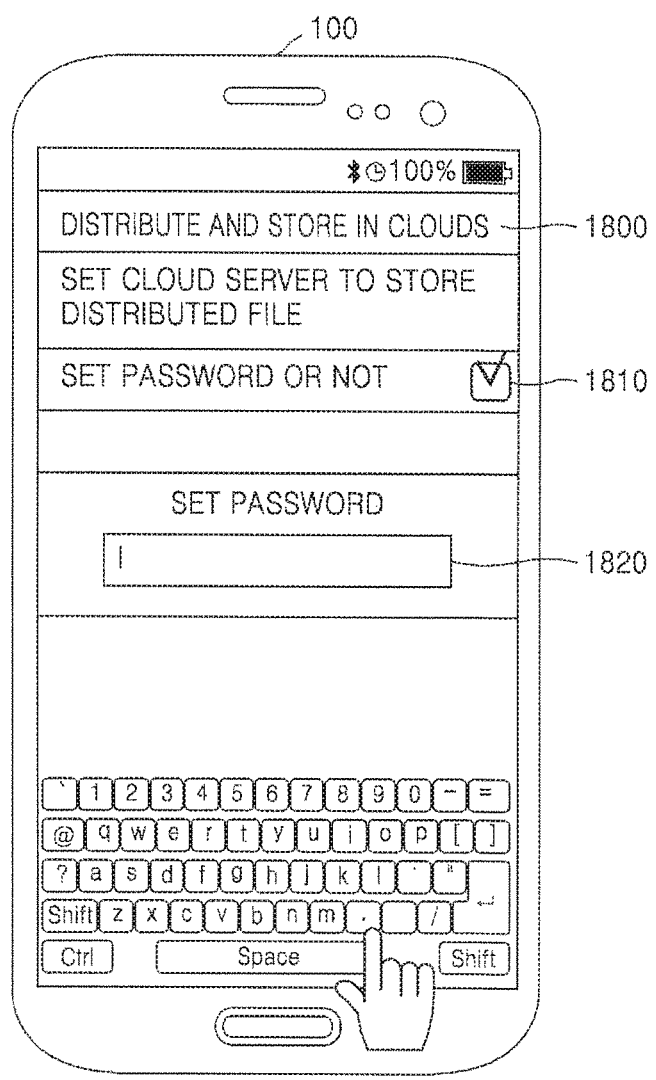
FIGS. 18A and 18B are diagrams illustrating an example method of receiving encryption information from a user to encrypt a file, the method being performed by the device.
Figure 18B:
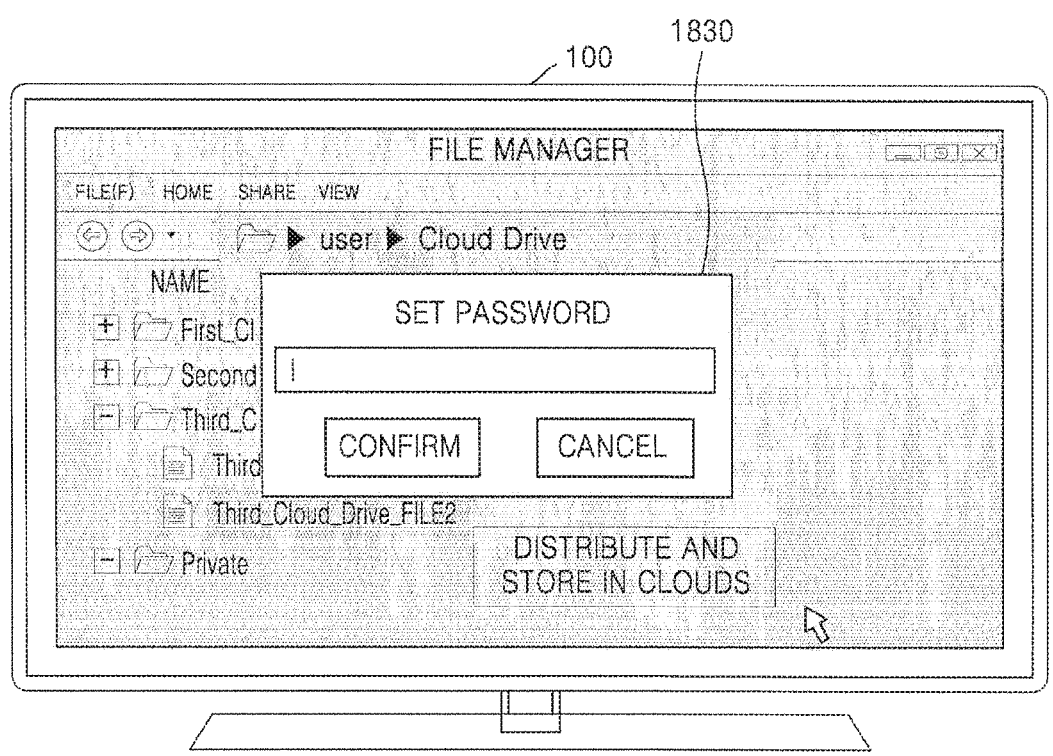

FIGS. 18A and 18B are diagrams illustrating an example method of receiving encryption information from a user so as to encrypt a file, the method being performed by the device 100.

Referring to FIG. 18A, the device 100 may provide a user interface with respect to encrypting a file.

For example, when the device 100 distributes and stores the file, the device 100 may provide a menu 1800 for setting a password to be used in encrypting the file. The menu 1800 for setting the password may include a check box 1810 for receiving an input of selecting whether or not to encrypt the file when the file is distributed and stored, an input field 1820 for receiving an input of the password, and a screen keyboard. When an input for storing the password input to the input field 1820 is received, the device 100 may encrypt the file, based, for example, on the input password.

Referring to FIG. 18B, when the device 100 distributes and stores a file, the device 100 may provide a user interface for receiving an input of setting a password in correspondence to the file.

For example, when an input for selecting the file and commanding the device 100 to distribute and store the file is received, the device 100 may display a setting window 1830 for receiving an input of setting a password in correspondence to the selected file. When the device 100 receives an input for inputting the password to the setting window 1830 in correspondence to the selected file, and storing the input password, the device 100 may encrypt the selected file by using the input password as an encryption key.

Figure 18C:
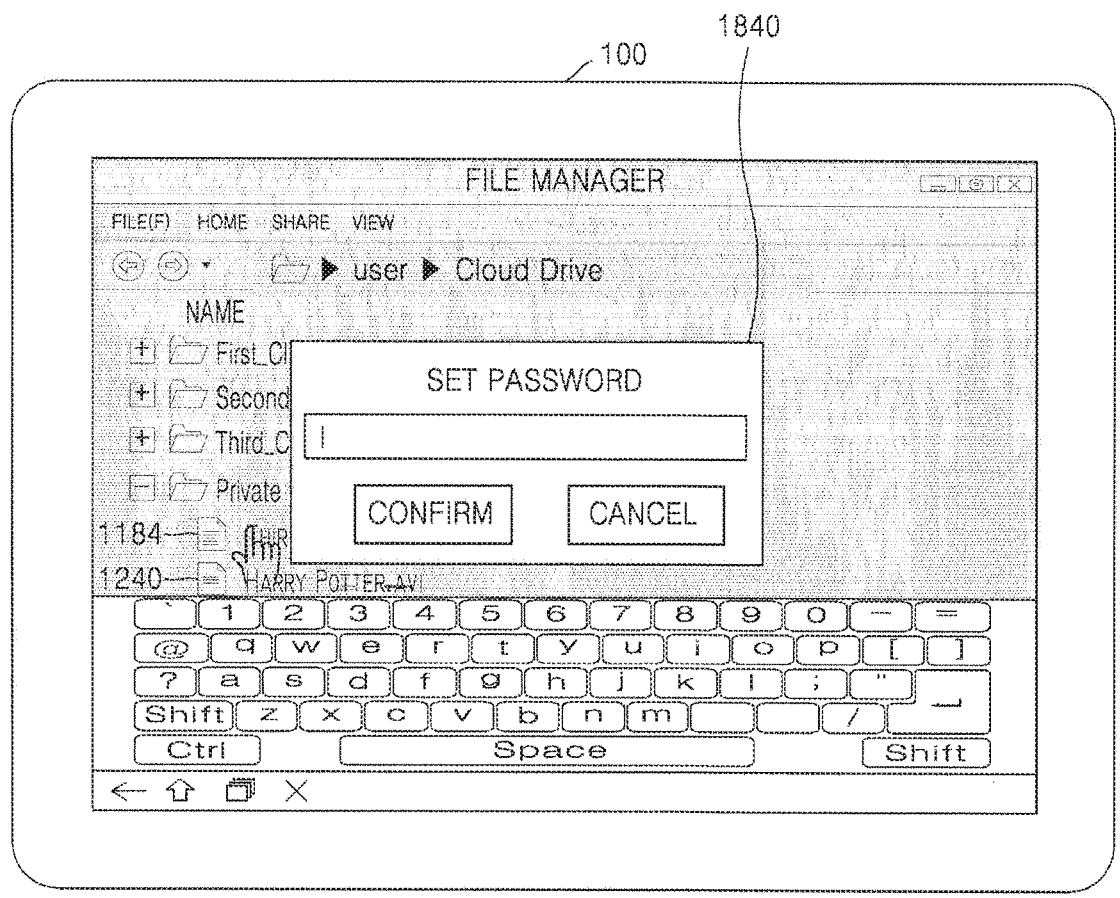
FIG. 18C is a diagram illustrating an example method of providing a user interface for receiving an input of decryption information after a user input for selecting a file that was encrypted, distributed, and stored is received, the method being performed by the device.

FIG. 18C is a diagram illustrating an example method of providing a user interface for receiving an input of decryption information after an input for selecting a file that was encrypted, distributed, and stored is received, the method being performed by the device 100.

The device 100 may display a list of distributed and stored files. The device 100 may receive an input of selecting a file from the list of the files. When the selected file was encrypted, distributed, and stored, the device 100 may display a password input window 1840 for receiving an input of decryption information.

When the device 100 receives an input for inputting a password to the password input window 1840 and completing an input, the device 100 may decrypt the selected file, based on the input password.

Figure 19:
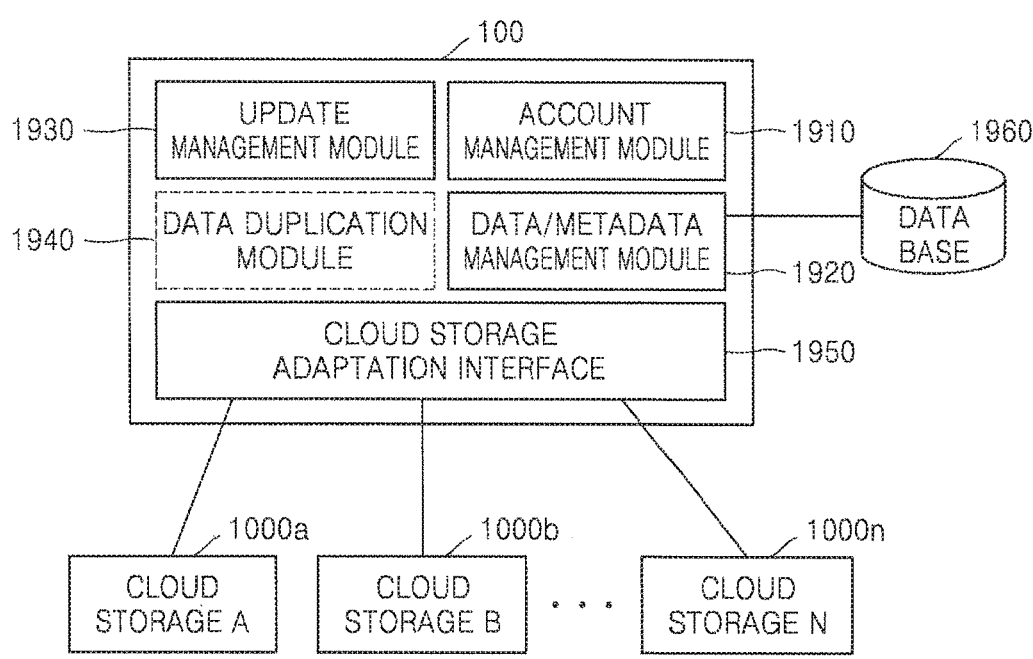
FIG. 19 is a diagram illustrating example modules in the device that performs a function of distributing and storing a file.

FIG. 19 is a diagram illustrating a plurality of example modules in the device 100, which perform a function of distributing and storing a file.

Referring to FIG. 19, the modules in the device 100 may perform the functions of distributing and storing a file. The modules may be embodied in a manner that a program loaded to a memory is executed in a processor in the device 100.

The device 100 may include, for example, an account management module 1910, a data/metadata management module 1920, an update management module 1930, a data duplication module 1940, and a cloud storage adaptation interface 1950. In an example embodiment, the device 100 may include a database module 1960 that performs a database function.

The account management module 1910 may, for example, manage an account of a user which is registered in the cloud storage 1000. For example, the account management module 1910 may store account information of the user. The account management module 1910 may exchange, based on the account of the user, data with the cloud storage 1000 without a separate input for inputting the account.

The data/metadata management module 1920 may, for example, store data and metadata of a file in the database module 1960 of the device 100, in correspondence to a data format supported by the device 100, wherein the file is received from the cloud storage 1000 or is to be stored in the cloud storage 1000. The data/metadata management module 1920 of the device 100 may, for example, manage the file by interoperating with the cloud storage 1000.

When a file is added, deleted, or updated in the cloud storage 1000 or the device 100, the update management module 1930 may, for example, synchronize the file with the cloud storage 1000 by interoperating with the cloud storage 1000.

The data duplication module 1940 may, for example, split a file of the user into a plurality of file fragments, and may store the split file fragments in a plurality of cloud storages 1000a through 1000n. The data duplication module 1940 may, for example, receive the file fragments corresponding to the file from the cloud storages 1000a through 1000n, and may regenerate the file by merging the file fragments.

The cloud storage adaptation interface 1950 may exchange data with the cloud storages 1000a through 1000n. The cloud storage adaptation interface 1950 may, for example, be embodied as an application programming interface (API) provided by a provider that runs each cloud storage 1000. For example, interface programs for respectively connecting the device 1000 with the cloud storages 1000a through 1000n may be, in the form of plug-in, added to or deleted from the cloud storage adaptation interface 1950.

In an example embodiment, the data duplication module 1940 of FIG. 19 may be embodied as a server.

For example, the data duplication module 1940 may distribute and store respective files of respective users. For example, the data duplication module 1940 may receive a request for distributing and storing a file from the device 100 of the user. When the request for distributing and storing a file is received, the data duplication module 1940 may receive the file from the device 100 of the user, may split the file into a plurality of file fragments, and may store the split file fragments in the cloud storages 1000a through 1000n.

The data duplication module 1940 may receive a request for the distributed-and-stored file from the device 100 of the user. When the request for a distributed-and-stored file is received, the data duplication module 1940 may receive the file fragments corresponding to the file from the cloud storages 1000a through 1000n, and may regenerate the file by merging the received file fragments. When the file is regenerated, the data duplication module 1940 may transmit the generated file to the device 100 of the user.

Figure 20:
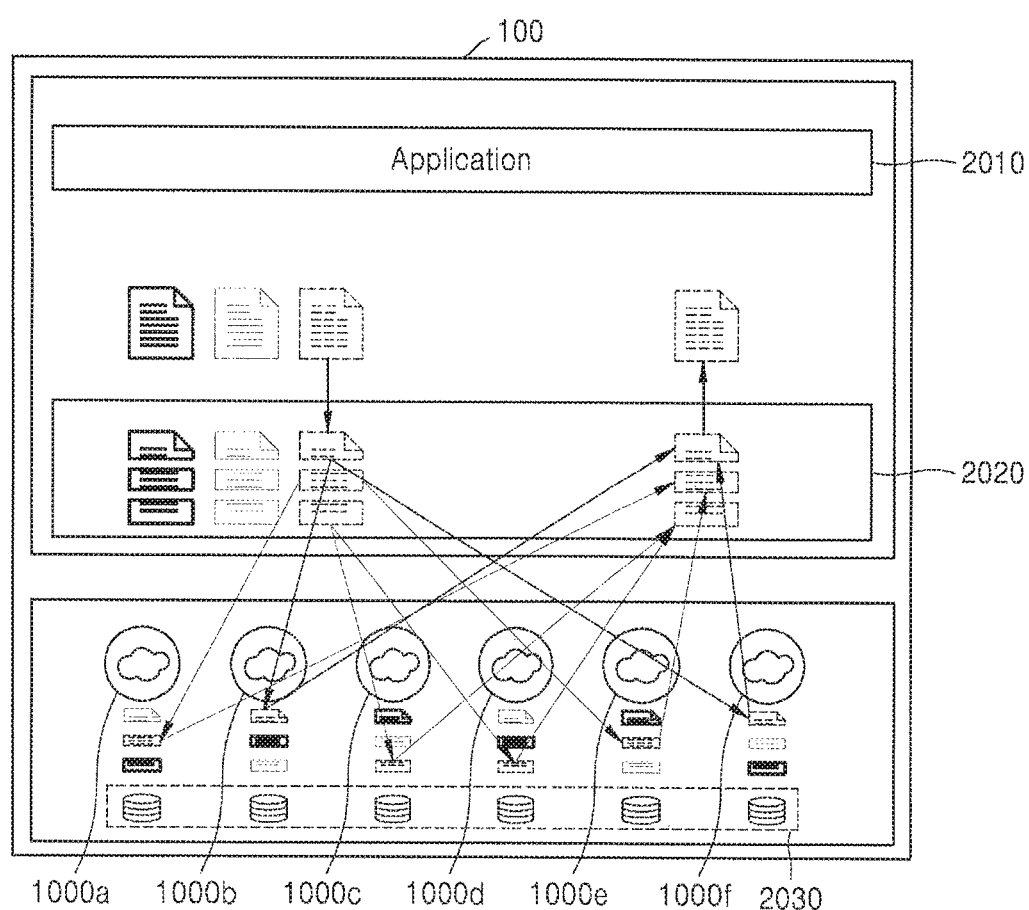
FIG. 20 is a diagram illustrating an example method of splitting a file into a plurality of file fragments, and distributing and storing the file fragments in the cloud storages, the method being performed by the device, according to an exemplary embodiment.

FIG. 20 is a diagram illustrating an example method of splitting a file into a plurality of file fragments, and distributing and storing the file fragments in a plurality of cloud storages 1000a through 1000f, the method being performed by the device 100.

Referring to FIG. 20, the device 100 may execute an application 2010. When the application 2010 is executed, the application 2010 may request a file storage module 2020 in the device 100 to store the file.

The file storage module 2020 may split the file into the file fragments and may distribute and store the file fragments in the cloud storages 1000a through 1000f.

When the application 2010 is executed, the application 2010 may request the file storage module 2020 for the file. The file storage module 2020 may receive the file fragments distributed and stored in the cloud storages 1000a through 1000f, and may regenerate the file by merging the received file fragments. When the file is regenerated, the application 2010 may execute the regenerated file.

The file storage module 2020 may generate a plurality of pieces of file split information 2030 for a plurality of files, respectively, and may store the plurality of pieces of generated file split information 2030 in the cloud storages 1000a through 1000f.

Figure 21:
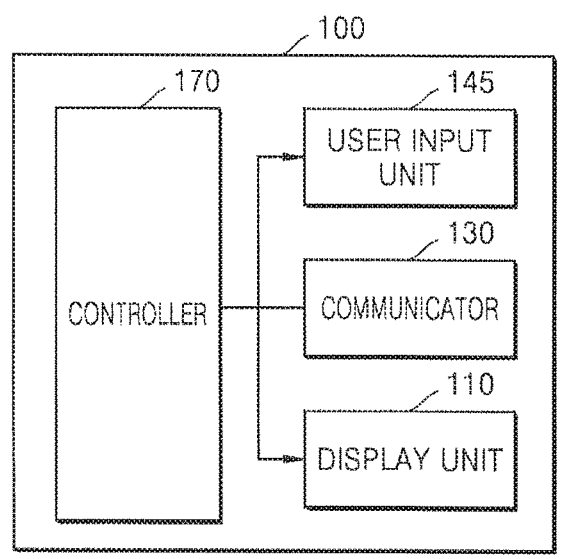
FIG. 21 is a block diagram illustrating an example device.

FIG. 21 is a block diagram illustrating an example device 100.

As illustrated in FIG. 21, the device 100 according to the example embodiment may include a controller (e.g., including processing circuitry) 170, a user input unit (e.g., including input circuitry) 145, a communicator (e.g., including communication circuitry) 130, and a display unit (e.g., including a display) 110. However, not all elements shown in FIG. 21 are necessary elements. For example, the device 100 may be embodied with more or less elements than the elements shown in FIG. 21.

The controller 170 may be configured to control the user input unit 145, the communicator 130, and the display unit 110. As noted above, the controller may be embodied as processing circuitry including, for example, one or more processors, each processor including one or more processor core and/or processing circuitry in the form of hardware, firmware and/or software. The communicator may be embodied, for example, a communication circuitry and/or communication modules comprising communication circuitry in the form of, for example, communication chips, hardware, firmware and/or software. The display unit may be embodied, for example, as a display that may include, for example, appropriate circuitry for driving and operating the display, including, for example, hardware, firmware and/or software. The input unit may include, for example, circuitry for inputting information including, for example, hardware, firmware and/or software.

The controller 170 may be configured to split a file stored in the device 100 so as to generate a plurality of file fragments.

The controller 170 may be configured to determine, from among the cloud storages 1000 in which a user of the device 100 is registered, the cloud storages 1000 to store the respective file fragments. For example, the controller 170 may be configured to determine the cloud storages 1000 to store a first file fragment from among the file fragments.

The controller 170 may be configured to determine, based on file split information, the cloud storages 1000 to store the respective file fragments. The controller 170 may be configured to generate (e.g., regenerate) the file by merging the file fragments received from the cloud storages 1000, and may be configured to execute the generated file.

The controller 170 may be configured to encrypt the file, and may be configured to split the encrypted file into a plurality of file fragments. In this example, the controller 170 may be configured to generate (e.g., regenerate) the file by merging the file fragments, and may decrypt the generated file.

The controller 170 may be configured to split the file so as to generate the file fragments, and may be configured to encrypt at least one among the file fragments. In this example, the controller 170 may be configured to decrypt the file fragments, and may be configured to generate the file by merging the decrypted file fragments.

When the controller 170 generates the file fragments by splitting the file, the controller 170 may be configured to move the file to a predefined folder.

The communicator 130 may be configured to exchange data with the cloud storage 1000. The communicator 130 may exchange data with an external device or an external server.

The communicator 130 may be configured to request the cloud storages 1000 to store the file fragments that correspond to the respective cloud storages 1000.

The communicator 130 may be configured to request each of the cloud storages 1000 to store the first file fragment, wherein each of the cloud storages 1000 was determined to store the first file fragment.

The communicator 130 may be configured to request at least one among the cloud storages 1000 to store file split information including identification information of the file fragments and identification information of the cloud storages 1000 to store the file fragments.

The communicator 130 may be configured to request the cloud storages 1000 to store the respective file fragments, wherein at least one among the file fragments was encrypted.

When the file is distributed and stored, the communicator 130 may be configured to request the cloud storage 1000 storing the file to delete the file.

The communicator 130 may be configured to receive the file fragments from the respective cloud storages 1000.

The communicator 130 may be configured to receive the file split information from at least one among the cloud storages 1000.

The communicator 130 may be configured to receive a same file fragment from each of two or more cloud storages 1000.

The communicator 130 may be configured to receive different portions of a same file fragment from two or more cloud storages 1000.

The input unit 145 may be configured to receive an input for distributing and storing the file, receiving the distributed-and-stored file, and executing the file.

For example, the input unit 145 may be configured to receive an input for selecting identification information of the file that was split into the file fragments.

The display unit 110 may be configured to display information with respect to distributing and storing the file, receiving the distributed-and-stored file, and executing the file.

Figure 22:
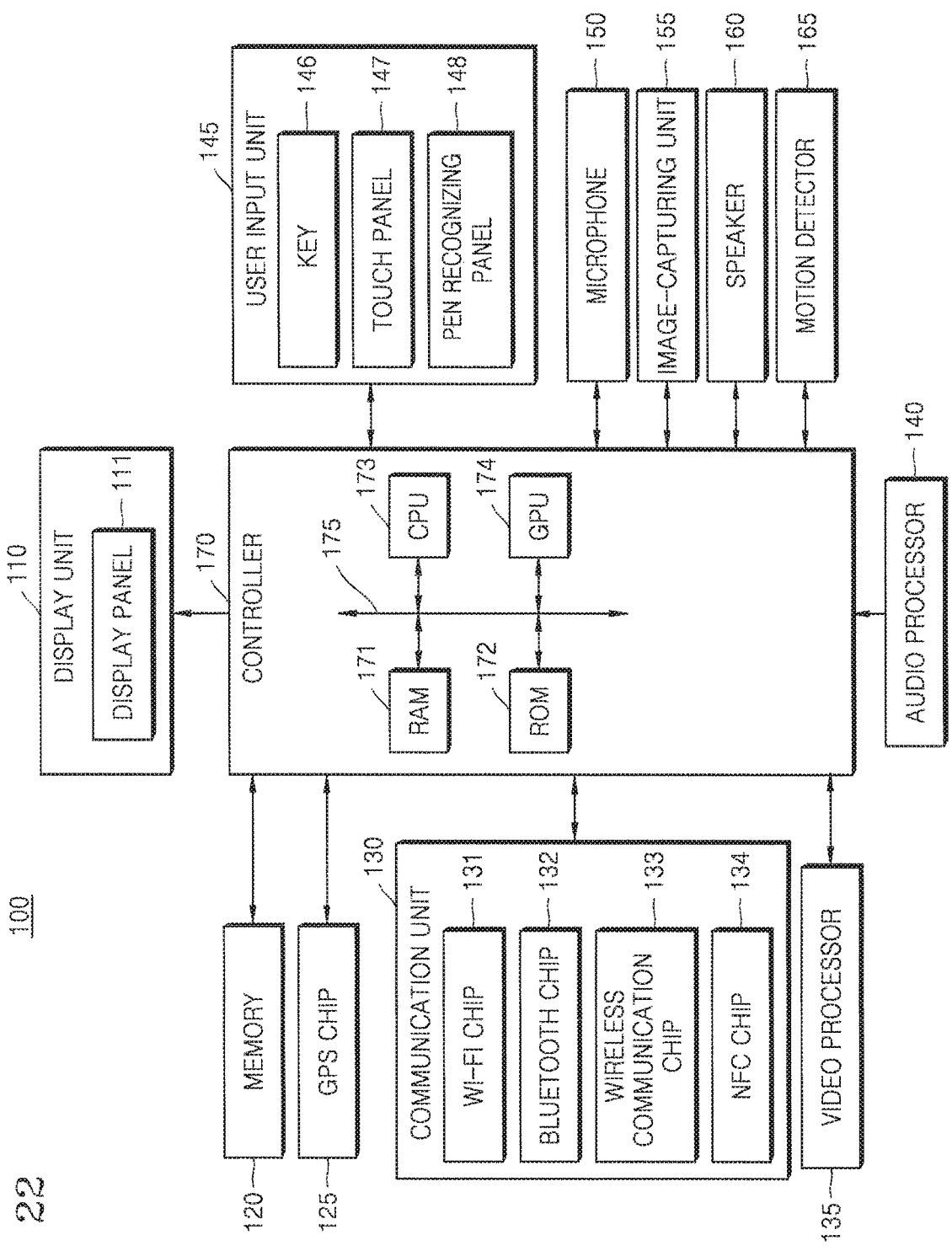
FIG. 22 is a block diagram illustrating an example device.

FIG. 22 is a block diagram illustrating an example device 100.

As illustrated in FIG. 22, a configuration of the device 100 may, for example, be applied to various types of a device such as a mobile phone, a tablet PC, a personal digital assistant (PDA), an MP3 player, a kiosk, an electronic photoframe, a navigation device, a digital television (TV), a smart watch, a wristwatch, or a wearable device such as smart glasses, head-mounted display (HMD), or the like.

Referring to FIG. 22, the device 100 may include the controller 170, the user input unit 145, the communicator 130, and the display unit 110, and may further include at least one of a memory 120, a global positioning system (GPS) chip 125, a video processor 135, an audio processor 140, a microphone 150, an image-capturing unit 155, a speaker 160, and a motion detector 165.

The display unit 110 may include a display panel 111 and a controller (not shown) that controls the display panel 111.

The display panel 111 may be embodied as various displays including a liquid crystal display (LCD) display, an organic light-emitting diode (OLED) display, an active matrix OLED (AMOLED) display, a plasma display panel (PDP), or the like. The display panel 111 may be formed to be flexible, transparent, and/or wearable. The display panel 111 may be combined with a touch panel 147 of the user input unit 145, and thus may be provided as a touchscreen (not shown). For example, the touchscreen may include an integrated module having a stack structure containing the display panel 111 and the touch panel 147.

The memory 120 may include at least one of an internal memory (not shown) and an external memory (not shown).

The internal memory may include at least one of a volatile memory (e.g., a dynamic random-access memory (DRAM), a static RAM (SRAM), a synchronous dynamic RAM (SDRAM), etc.), a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid-state drive (SSD), or the like. According to the example embodiment, the controller 170 may be configured to load a command or data, which is received from at least one of the non-volatile memory and another element, to the volatile memory, and may process the command or the data. The controller 170 may be configured to store, in the non-volatile memory, data that is received from or is generated by another element.

The external memory may include at least one of a compact flash (CF) memory, a secure digital (SD) memory, a micro secure digital (micro-SD) memory, a mini secure digital (mini-SD) memory, an extreme digital (xD) memory, and a memory stick, or the like.

The memory 120 may store various programs and data used in operations of the device 100. For example, the memory 120 may temporarily or semi-permanently store a portion of contents to be displayed on a lock screen.

The controller 170 may be configured to control the display unit 110 to display a portion of contents which is stored in the memory 120. In other words, the controller 170 may display, on the display unit 110, the portion of the contents which is stored in the memory 120. Alternatively, when a user's gesture is performed in a region of the display unit 110, the controller 170 may perform a control operation that corresponds to the user's gesture.

The controller 170 may include at least one of a Random Access Memory (RAM) 171, a read-only memory (ROM) 172, a central processing unit (CPU) 173, a Graphics Processing Unit (GPU) 174, and a bus 175. The RAM 171, the ROM 172, the CPU 173, and the GPU 174 may be connected to each other via the bus 175.

The CPU 173 accesses the memory 120, and performs a booting operation by using an operating system (O/S) stored in the memory 120. Also, the CPU 173 performs various operations by using the various programs, a plurality of items of content, a plurality of items of data, etc. which are stored in the memory 120.

The ROM 172 stores a command set for booting up a system. For example, when a turn-on command is input to the device 100, and power is supplied to the device 100, the CPU 173 may copy the operating system stored in the memory 120 to the RAM 171, according to the command stored in the ROM 172, may execute the operating system, and thus may boot up the system. When the booting operation is completed, the CPU 173 copies the various programs stored in the memory 120 to the RAM 171, and performs the various operations by executing the programs copied to the RAM 171. When the device 100 is booted up, the GPU 174 displays a user interface screen in a region of the display unit 110. In more detail, the GPU 174 may generate a screen that displays an electronic document including various objects such as content, an icon, a menu, or the like. The GPU 174 calculates coordinate values of the objects that are to be displayed according to a layout of the user interface screen, and calculates attribute values of shapes, sizes, or colors of the objects. Then, the GPU 174 may generate user interface screens with various layouts including the objects based on the calculated attribute values. The user interface screen generated by the GPU 174 may be provided to the display unit 110 and thus may be displayed in areas of the display unit 110.

The GPS chip 125 may receive a GPS signal from a GPS satellite and may calculate a current position of the device 100. In a case where a navigation program is used or a current position of the user is required, the controller 170 may calculate a position of the user by using the GPS chip 125.

The communicator 130 may communicate with various external devices according to various types of communication methods. The communicator 130 may include at least one of a Wi-Fi chip 131, a Bluetooth chip 132, a wireless communication chip 133, and a Near field communication (NFC) chip 134. The controller 170 may communicate with the various external devices by using the communicator 130.

The Wi-Fi chip 131 and the Bluetooth chip 132 may perform communication by using Wi-Fi and Bluetooth, respectively. If the Wi-Fi chip 131 or the Bluetooth chip 132 is used, the Wi-Fi chip 131 or the Bluetooth chip 132 may first transmit and receive various types of connection information including a service set identification (SSID), a session key, or the like, may establish a connection for communication by using the connection information, and then may transmit and receive various types of information. The wireless communication chip 133 may indicate a chip that performs communication according to various communication standards such as the Institute of Electrical and Electronics Engineers (IEEE), ZigBee, 3rd generation (3G), 3rd Generation Partnership Project (3GPP), LTE, or the like. The NFC chip 134 indicates a chip that operates in using NFC by using a 13.56 MHz band from among various radio frequency-identification (RF-ID) frequency bands such as 135 kHz, 13.56 MHz, 433 MHz, 860 through 960 MHz, 2.45 GHz, or the like.

The video processor 135 may process video data included in content received by using the communicator 130 or may process video data included in content stored in the memory 120. The video processor 135 may perform various image processing such as decoding, scaling, noise filtering, frame rate conversion, resolution conversion, or the like on the video data.

The audio processor 140 may process audio data included in content received by using the communicator 130 or may process audio data included in content stored in the memory 120. The audio processor 140 may perform various processing such as decoding, amplification, noise filtering, or the like on the audio data.

When a reproducing program for multimedia content is executed, the controller 170 may reproduce the multimedia content by driving the video processor 135 and the audio processor 140. The speaker 160 may output audio data generated in the audio processor 140.

The user input unit 145 may receive an input of various instructions from a user. The user input unit 145 may include at least one of a key 146, a touch panel 147, and a pen recognizing panel 148.

The key 146 may be of various types such as a mechanical button, a wheel, or the like that may be formed in a front portion, a side portion, a rear portion, etc., of an external surface of a body of the device 100.

The touch panel 147 may sense a touch input by the user and may output a value of a touch event that corresponds to a signal generated by the sensed touch input. When the touch panel 147 is combined with the display panel 111 and thus is formed as a touchscreen, the touchscreen may be configured as a capacitive touchscreen, a resistive touchscreen, or a piezoelectric touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen which causes upper and lower plates of a touched point to contact each other. The touch event that occurs on the touchscreen may be mainly generated by a finger of a person but may also be generated by an object formed of a conductive material capable of changing capacitance.

The pen recognizing panel 148 may sense a proximity input or a touch input of a touch pen (e.g., a stylus pen or a digitizer pen) which is performed by a user, and may output a sensed pen proximity event or a sensed pen touch event. The pen recognizing panel 148 may be an electromagnetic resonance (EMR)-type pen recognizing panel, and may sense the touch input or the proximity input according to changes in a strength of an electromagnetic field, which occur when the touch pen approaches or touches the touchscreen. In more detail, the pen recognizing panel 148 may include an electromagnetic induction coil sensor (not shown) having a grid structure, and an electric signal processor (not shown) for sequentially providing an alternating current (AC) signal having a predetermined frequency to each loop coil of the electromagnetic induction coil sensor. When a pen having an internal resonance circuit is positioned near a loop coil of the pen recognizing panel 148, a magnetic field transmitted from the loop coil generates a current in the resonance circuit in the pen, based on mutual electrostatic induction. Due to the current, an induction field is generated from a coil forming the resonance circuit in the pen, and the pen recognizing panel 148 detects the induction field from the loop coil capable of receiving a signal, and thus senses the touch input or the proximity input by the pen. The pen recognizing panel 148 may be arranged to occupy a preset area below the display panel 111, e.g., may have a size capable of covering a display region of the display panel 111.

The microphone 150 may receive an input of a user's voice or other sound and may convert the user's voice or other sound to audio data. The controller 170 may use the user's voice, which is input via the microphone 150, in a call-related operation or may convert the user's voice to the audio data and may store the audio data in the memory 120.

The image-capturing unit 155 may capture a still image or a moving picture according to a control by the user. The image-capturing unit 155 may be plural in number and include a front camera, a rear camera, or the like.

If the image-capturing unit 155 and the microphone 150 are formed, the controller 170 may perform a control operation according to a user's voice input via the microphone 150 or a user's motion recognized by the image-capturing unit 155. For example, the device 100 may operate in a motion control mode or a voice control mode. If the device 100 operates in the motion control mode, the controller 170 may activate the image-capturing unit 155 and may capture an image of the user, may trace a change in motions of the user, and may perform a control operation corresponding thereto. If the device 100 operates in the voice control mode (i.e., a voice recognition mode), the controller 170 may analyze a user's voice input via the microphone 150, and may perform a control operation according to the analyzed user's voice.

The motion detector 165 may detect movement of a body of the device 100. The device 100 may rotate or may tilt in various directions. Here, the motion detector 165 may detect a movement characteristic such as a rotation direction, a rotation angle, a tilted angle, or the like by using at least one among various sensors including a magnetic sensor, a gyroscope sensor, an acceleration sensor, etc.

Although not illustrated in FIG. 22, the present exemplary embodiment may further include a universal serial bus (USB) port for connecting the device 100 and a USB connector, various external input ports including a headset, a mouse, a LAN, etc. for connection with various external terminals, a digital multimedia broadcasting (DMB) chip for receiving and processing a DMB signal, various sensors, or the like.

Names of the elements of the device 100 may be changed. Also, the device 100 according to the example embodiment may be embodied by including at least one among the elements, or may be embodied with more or less elements than the elements.

Figure 23:
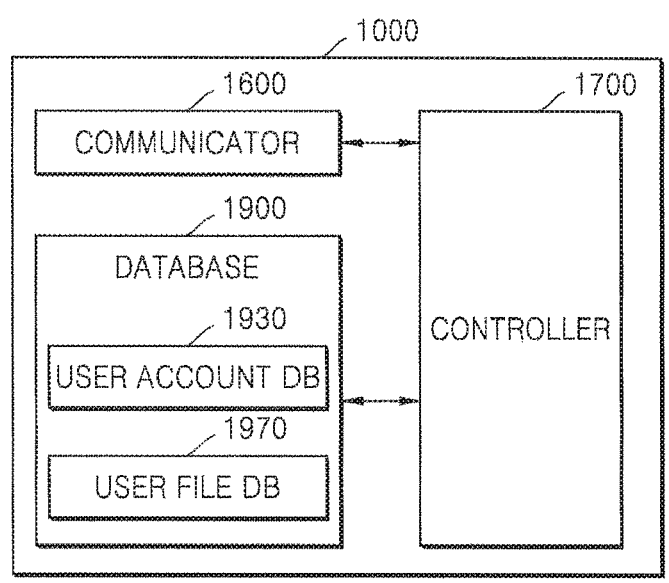
FIG. 23 is a block diagram illustrating an example cloud storage.

FIG. 23 is a block diagram illustrating an example of the cloud storage 1000.

Referring to FIG. 23, the cloud storage 1000 according to the example embodiment may include a communicator (e.g., including communication circuitry) 1600, a controller (e.g., including processing circuitry) 1700, and a database 1900. The database 1900 may include a user account database (DB) 1930 and a user file DB 1970.

The user account DB 1930 may store identification information and password information of a user who is registered in the cloud storage 1000. The user account DB 1930 may also store access information which was issued to the device 100 when the cloud storage 1000 authenticated the user. The user account DB 1930 may also store session maintenance information used to maintain a session between the device 100 and the cloud storage 1000.

The user file DB 1970 may store a file of the user. For example, the user file DB 1970 may store content data and metadata of the file of the user. In this example, the file of the user may be stored in the user file DB 1970 in correspondence to the identification information of the user.

The communicator 1600 may be configured to receive, from the device 100, a request for storing the file. When the communicator 1600 receives the request for storing the file, the controller 1700 may be configured to store the received file in correspondence to the identification information of the user.

The communicator 1600 may be configured to receive, from the device 100, a request with respect to the file. When the request with respect to the file is received, the controller 1700 may obtain the file of the user, based on the identification information of the user and identification information of the file, and may be configured to transmit the obtained file of the user to the device 100 via the communicator 1600.

The controller 1700 may be configured to synchronize the file of the user with the device 100 of the user. For example, when the file of the user in the user file DB 1970 is modified, deleted, or updated, the controller 1700 may be configured to request, via the communicator 1600, the device 100 to modify, delete, or update the same file. When the user's file in the device 100 is modified, deleted, or updated, the controller 1700 may be requested, by the device 100 via the communicator 1600, to modify, delete, or update the same file.

The one or more example embodiments may be embodied as computer readable code/instructions on a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals such as carrier signals, or other transmission mechanism, and includes other information transmission mediums.

It should be understood that the example embodiments described herein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While one or more example embodiments have been described with reference to the figures, it will be understood by those of ordinary skill in the art that various changes in form and details may be made therein without departing from the spirit and scope as defined by the following claims.

What is claimed is:

1. A device comprising:
a communicator comprising communication circuitry;
a memory for storing instructions; and
a processor configured to execute the stored instructions to at least:
generate a plurality of file fragments by splitting a file stored in the device, based on a security level set for the file,
determine a plurality of cloud storages in which to store respective file fragments of the plurality of file fragments, based on the security level set for the file, wherein a number of the cloud storages determined is based on the security level so that the higher the security level of the file the more the file will be distributed, wherein the plurality of cloud storages are selected from among cloud storages in which a user of the device is registered; and
control to transmit, via the communicator, a request to the determined plurality of cloud storages to store the respective file fragments of the plurality of file fragments, the higher the security level set for the file, the more the file will be split into more plurality of file fragments, and the higher the security level set for the file determine more of the plurality of cloud storages corresponding to the more plurality of the split file fragments.

2. The device of claim 1, wherein the file stored in the device is received from one among the plurality of cloud storages.

3. The device of claim 1, wherein the processor is configured to execute the instructions further to:
determine, from among the plurality of cloud storages, two or more cloud storages in which to store a first file fragment from among the plurality of file fragments, and
control to transmit, via the communicator, a request to each of the two or more cloud storages to store the first file fragment.

4. The device of claim 1, wherein the processor is configured to execute the instructions further to:
control to transmit, via the communicator, a request to at least one among the plurality of cloud storages to store file split information, the file split information comprising identification information of the plurality of file fragments and identification information of the plurality of cloud storages storing the plurality of file fragments.

5. The device of claim 1, wherein the processor is configured to execute the instructions further to:
encrypt the file based on an encryption key, to generate the plurality of file fragments by splitting the encrypted file, and to store the encryption key in at least one of the device or in at least one among the plurality of cloud storages.

6. The device of claim 1, wherein the processor is configured to execute the instructions further to:
generate the plurality of file fragments by splitting the file, to encrypt one or more file fragments among the plurality of file fragments based on an encryption key, and to store the encryption key in at least one of the device or in at least one among the plurality of cloud storages, and
control to transmit, via the communicator, a request to the plurality of cloud storages to store respective file fragments of the plurality of file fragments comprising the two or more encrypted file fragments.

7. The device of claim 1, wherein, when respective file fragments of the plurality of file fragments are stored in respective cloud storages of the plurality of cloud storages, and the processor is configured to execute the instructions further to delete the file stored in the device.

8. The device of claim 1, wherein the file stored in the device is also stored in a cloud storage from among the plurality of cloud storages, and
wherein the processor is configured to execute the instructions further to:
control to transmit, via the communicator, a request to the cloud storage storing the file to delete the file.

9. A device comprising:
a communicator comprising communication circuitry;
a memory for storing instructions; and
a processor configured to execute the stored instructions to at least:
determine a plurality of cloud storages for storing respective file fragments of a plurality of file fragments split from a file based on a security level set for the file, wherein a number of the cloud storages determined is based on the security level so that the higher the security level of the file the more the file will be distributed, control to receive, via the communicator, the plurality of file fragments from the determined plurality of cloud storages; and regenerate the file by merging the plurality of file fragments, and to execute the regenerated file, the higher the security level set for the file, the more the file is split into more plurality of file fragments, and the higher the security level set for the file the more plurality of cloud storages corresponding to the more plurality of the split file fragments are determined.

10. The device of claim 9, wherein the processor is configured to execute the instructions further to:

control to receive, via the communicator, from at least one among the plurality of cloud storages, file split information comprising identification information of the plurality of file fragments and identification information of the plurality of cloud storages storing the plurality of file fragments, and determine, based on the file split information, the plurality of cloud storages storing the respective plurality of file fragments.

11. The device of claim 9, wherein a first file fragment from among the plurality of file fragments is stored in two or more cloud storages from among the plurality of cloud storages, wherein the processor is configured to execute the instructions further to:

select one from among the two or more cloud storages in correspondence to the first file fragment, and control to receive, via the communicator, the first file fragment from the selected cloud storage.

12. The device of claim 9, wherein a second file fragment from among the plurality of file fragments is stored in two or more cloud storages from among the plurality of cloud storages, and wherein the processor is configured to execute the instructions further to:

control to receive, via the communicator, different portions of the second file fragment from the two or more cloud storages.

13. A method of storing a file by a device, the method comprising:

generating a plurality of file fragments by splitting the file stored in the device, based on a security level set for the file;

determining a plurality of cloud storages used to store respective file fragments of the plurality of file fragments, based on the security level set for the file, wherein a number of the cloud storages determined is based on the security level so that the higher the security level of the file the more the file will be distributed, wherein the plurality of cloud storages are selected from among cloud storages in which a user of the device is registered; and transmitting a request to the determined plurality of cloud storages to store respective file fragments of the plurality of file fragments, wherein the generating the plurality of file fragments comprises, the higher the security level set for the file, splitting the file into more plurality of file fragments, and wherein the determining the plurality of cloud storages comprises, the higher the security level set for the file, determining more plurality of cloud storages corresponding to the more plurality of the split file fragments.

14. The method of claim 13, wherein the file stored in the device has been received from one among the plurality of cloud storages.

15. The method of claim 13, wherein the selecting of the plurality of cloud storages comprises selecting, from among the cloud storages, two or more cloud storages used to store a first file fragment from among the plurality of file fragments, and wherein the transmitting a request to the determined plurality of cloud storages comprises requesting each of the two or more cloud storages to store the first file fragment.

16. The method of claim 13, further comprising transmitting a request to at least one among the plurality of cloud storages to store file split information comprising identification information of the plurality of file fragments and identification information of the plurality of cloud storages storing the plurality of file fragments.

17. The method of claim 13, wherein the generating of the plurality of file fragments comprises: encrypting the file based on an encryption key; and generating the plurality of file fragments by splitting the encrypted file, and storing the encryption key in at least one of the device or in at least one among the plurality of cloud storages.

18. The method of claim 13, wherein the generating of the plurality of file fragments comprises:

generating the plurality of file fragments by splitting the file; and encrypting two or more file fragments among the plurality of file fragments based on an encryption key, and storing the encryption key in at least one of the device or in at least one among the plurality of cloud storages, and wherein the transmitting a request to the determined plurality of cloud storages comprises requesting the plurality of cloud storages to store respective file fragments of the plurality of file fragments comprising the two or more encrypted file fragments.

19. The method of claim 13, further comprising, when the plurality of file fragments are respectively stored in the plurality of cloud storages, deleting the file stored in the device.

20. The method of claim 13, wherein the file stored in the device is also stored in a cloud storage from among the plurality of cloud storages, and wherein the method further comprises transmitting a request to the cloud storage storing the file to delete the file.

* * * * *